(12) United States Patent
Yamanaka

(10) Patent No.: US 8,338,511 B2
(45) Date of Patent: Dec. 25, 2012

(54) THERMOPLASTIC POLYESTER RESIN COMPOSITION

(75) Inventor: Yasushi Yamanaka, Hiratsuka (JP)

(73) Assignee: Mitsubishi Engineering-Plastics Corporation, Tokyo (JP)

( * ) Notice: Subject to any disclaimer, the term of this patent is extended or adjusted under 35 U.S.C. 154(b) by 0 days.

(21) Appl. No.: 13/055,420

(22) PCT Filed: Jul. 22, 2009

(86) PCT No.: PCT/JP2009/003421
§ 371 (c)(1),
(2), (4) Date: Apr. 14, 2011

(87) PCT Pub. No.: WO2010/010691
PCT Pub. Date: Jan. 28, 2010

(65) Prior Publication Data
US 2011/0184101 A1  Jul. 28, 2011

(30) Foreign Application Priority Data

| Jul. 23, 2008 | (JP) | ................................ | 2008-190284 |
| Oct. 28, 2008 | (JP) | ................................ | 2008-277459 |
| Jul. 8, 2009 | (JP) | ................................ | 2009-162073 |

(51) Int. Cl.
*C08K 5/5313* (2006.01)
*C08K 3/38* (2006.01)

(52) U.S. Cl. ......................... 524/126; 524/133; 524/405

(58) Field of Classification Search .................. 524/126, 524/133, 405
See application file for complete search history.

(56) References Cited

U.S. PATENT DOCUMENTS

| 6,096,816 A * | 8/2000 | Kuckro ........................ | 524/405 |
| 2004/0192812 A1 | 9/2004 | Engelmann et al. | |
| 2006/0074154 A1 | 4/2006 | Harashina et al. | |
| 2008/0039571 A1 | 2/2008 | Cohoon et al. | |
| 2008/0139711 A1 | 6/2008 | Borade et al. | |
| 2009/0048373 A1 | 2/2009 | Clauss et al. | |

FOREIGN PATENT DOCUMENTS

| CN | 1732232 A | 2/2006 |
| CN | 101068884 A | 11/2007 |
| DE | 10 2004 050 555 A1 | 4/2006 |
| JP | 2000-44781 A | 2/2000 |
| JP | 2000-327886 A | 11/2000 |
| JP | 2001-342357 A | 12/2001 |
| JP | 2002-161211 A | 6/2002 |
| JP | 2004-204194 A | 7/2004 |
| JP | 2004-537630 A | 12/2004 |
| JP | 2005-82723 A | 3/2005 |
| JP | 2006-117722 A | 5/2006 |

OTHER PUBLICATIONS

English Translation of International Preliminary Report on Patentability (PCT/IB/338 and PCT/IB/373 and PCT/IB/326) and Written Opinion of the International Searching Authority (PCT/ISA/237) mailed on Mar. 17, 2011 for PCT/JP2009/003420.
English Translation of International Preliminary Report on Patentability (PCT/IB/338 and PCT/IB/373 and PCT/IB/326) and Written Opinion of the International Searching Authority (PCT/ISA/237) mailed on Mar. 17, 2011 for PCT/JP2009/003421.
Extended European Search Report dated Aug. 11, 2011 for corresponding European Application No. 09800207.4.
Extended European Search Report issued in European Patent Application No. 09800206.6 on Aug. 16, 2011.
International Search Report dated Oct. 13, 2009 in International Application No. PCT/JP2006/003420.
International Search Report dated Oct. 13, 2009 in International Application No. PCT/JP2009/003421.
Notification of First Office Action for Chinese Patent Application No. 200980128698.2, issued May 17, 2012, with English translation.
Chinese Office Action, dated Jun. 25, 2012, for Chinese Application No. 200980128696.3.

* cited by examiner

*Primary Examiner* — Peter Szekely
(74) *Attorney, Agent, or Firm* — Birch, Stewart, Kolasch & Birch, LLP

(57) ABSTRACT

Disclosed is a thermoplastic polyester resin composition excellent in flame resistance, mechanical strength, and laser printability. The thermoplastic resin composition comprising 100 parts by weight of a thermoplastic polyester resin (A), 5 to 60 parts by weight of a phosphinate (B) represented by the following formula (1) or (2), 0.1 to 20 parts by weight of an organosiloxane (C), and 0.01 to 30 parts by weight of a colemanite (D), wherein the organosiloxane (C) is an organosiloxane compound (C-a) comprising organic groups bonding to a silicon atom directly or through an oxygen atom, wherein 40 mole % or more of the organic groups are an aryl group, and/or an organosiloxane polymer (C-b) in the form of solid at 25° C.

20 Claims, 1 Drawing Sheet

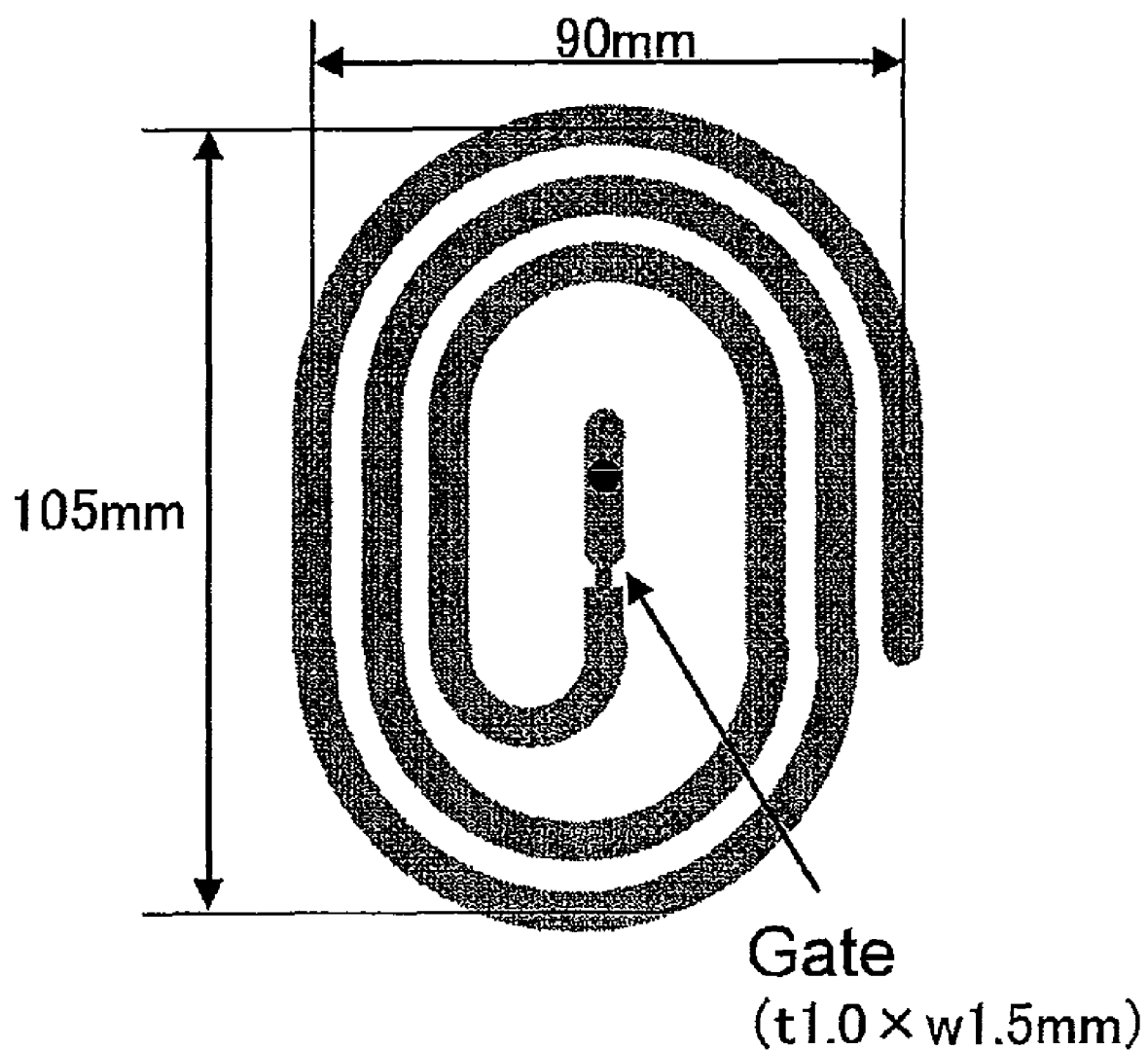

THERMOPLASTIC POLYESTER RESIN COMPOSITION

TECHNICAL FIELD

The invention relates to a thermoplastic polyester resin composition which is excellent in productivity and mechanical characteristics in addition to in flame resistance even if the resin composition does not include any halogen series flame retardant, and to a molded article using the composition. Further the invention relates to a thermoplastic polyester resin composition excellent in laser printability.

RELATED ART

The thermoplastic polyester resin is widely used for electrical and electronics equipment components in addition to automobile components from the viewpoint of the excellent characteristics. Heretofore, various recipes for such a resin have been developed so as to satisfy desired characteristics, and thereby achievement of high functionality and high performance has been made.

However, in recent years, characteristics to be desired are becoming higher, and therefore, it is becoming difficult to manage to use conventional recipes. For example, in recent years, electronic components such as connector are getting more lightweight and smaller, and the thickness of such a molded article is getting thinner. Accordingly, to respond to this, there is a case that the resin composition for use in such molding is desired to have more excellent mechanical characteristics and flame resistance than conventional resin compositions.

Heretofore, in order to improve the flame resistance of the thermoplastic resin, a halogen series flame retardant has been mainly used. However, a resin containing a halogen series flame retardant may produce dioxin when a used molded article thereof is incinerated, and therefore, it is desirable to use a non-halogen series flame retardant. As one for responding to such a demand, it is investigated that phosphorous compounds, especially a calcium salt or aluminium salt of phosphine acid represented by the following formula (1) or (2), are used as a flame retardant.

[Chemical 1]

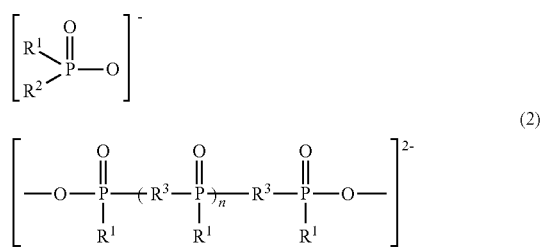

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

Patent Document 1 discloses use of the calcium phosphinate or the aluminium phosphinate as a flame retardant. However, such a method requires a large amount of the salt in order to achieve good flame resistance and results in lower moldability and mechanical characteristic of the obtained resin composition.

Patent Document 2 discloses a combination use of a calcium phosphinate or an aluminium phosphinate with an organic nitrogen compound such as melamine cyanurate as a flame retardant. Such a method improves the flame resistance to some degree. However, there were problems in that the mold pollution is serious since a large amount of gas is produced in molding.

In general, a method for imparting toughness with the resin composition, for example, comprises adding a polymer having low elastic modulus such as elastomer as disclosed in patent Document 3. However, the addition of the elastomer into the resin composition decrease the flame resistance, and therefore, it is difficult to ensure both of the toughness and the flame resistance.

Patent Document 4 discloses that a particular organic phosphorous compound is used as a flame retardant and a flame retardant synergist is added thereto. Patent Document 4 exemplifies various kinds of the flame retardant synergists, and some thereof are known as a flame retardant in itself. While the flame retardant synergist s that the document discloses cover a broad range from organic substance to inorganic substance, balance of the individual ingredients is factually important in the resin composition, and it is doubtful that all of those exert similar effects and similar characteristics to each other.

Patent Document 5 discloses that an addition of a melamine cyanurate and a metal borate to a calcium salt or an aluminium salt of phosphinic acid as a flame retardant at a particular ratio reduces to produce gas. However, there was a problem in that the gas production was not remarkably decreased by adding nitrogen series flame retardants such as melamine cyanurate having a low initial temperature for thermal desomposition, and thereby, the metal pollution was kept.

Patent Documents 6 and 7 disclose that a halogen series flame retardant and colemanite mineral (calcium borate.5-hydrate) are added into a thermoplastic polyester resin composition.

As mentioned above, when a particular additive is added into a thermoplastic polyester resin composition to improve a particular characteristic for the composition, the composition often becomes to deteriorate in another characteristics. On the other hand, demanded is a resin composition which is excellent in various characteristics in a balanced manner in accordance with the use of the molded article. For example, the thermoplastic resin composition which has high flame resistance, high mechanical strength, excellent electronic characteristics, and excellent laser printability, and which is decreased in mold deposit is desired.

RELATED DOCUMENT

Patent Document

[Patent Document 1] JP-A-H8-73720
[Patent Document 2] JP-A-H11-60924
[Patent Document 3] JP-A-H7-150022
[Patent Document 4] WO2004/061008
[Patent Document 5] JP-A-2006-117722
[Patent Document 6] JP-A-S59-202253
[Patent Document 7] U.S. Pat. No. 3,456,104

DISCLOSURE OF INVENTION

Problems to be Resolved by the Invention

As above mentioned, heretofore, various thermoplastic resin compositions have been disclosed. However, it was difficult to obtain a composition which has the flame resistance and which is excellent in various characteristics in a balanced manner.

Under such a situation, the object of the invention is to provide a thermoplastic resin composition which has high flame resistance and mechanical strength, which is excellent in electronic characteristics, which is decreased in mold deposit, and which is excellent in laser printability.

Means of Solving the Problems

Under such a situation, the inventor has earnestly investigated and found that a resin composition which is excellent in the flame resistance and in the balance as a resin composition can be obtained by adding a particular organosiloxane and colemanite as well as a phosphorous flame retardant to a thermoplastic polyester resin, and thereby, has completed the invention. In particular, the invention has a technical significance in that the inventor found that the composition excellent in laser printability without breaking down the balance between the properties can be obtained by adding colemanite.

Specifically, the above problem was solved by the following means.

[1] A thermoplastic resin composition comprising 100 parts by weight of a thermoplastic polyester resin (A), 5 to 60 parts by weight of a phosphinate (B) represented by the following formula (1) or (2), 0.1 to 20 parts by weight of an organosiloxane (C), and 0.01 to 30 parts by weight of a colemanite (D), wherein the organosiloxane (C) is an organosiloxane compound (C-a) comprising organic groups bonding to a silicon atom directly or through an oxygen atom, wherein 40 mole % or more of the organic groups are an aryl group, and/or an organosiloxane polymer (C-b) in the form of solid at 25° C.;

[Chemical 2]

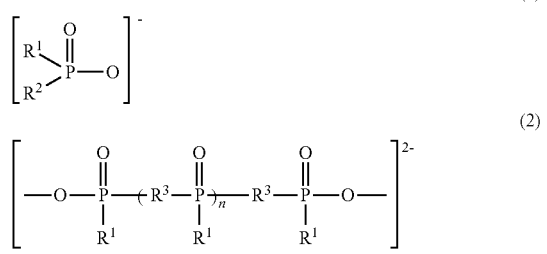

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

[2] The thermoplastic polyester resin composition according to [1], wherein the organosiloxane (C) is the organosiloxane compound (C-a) comprising organic groups bonding to a silicon atom directly or through an oxygen atom, wherein 40 mole % or more of the organic groups are an aryl group.

[3] The thermoplastic polyester resin composition according to [1] or [2], wherein the content of the organosiloxane (C) is 0.1 to 17 parts by weight, relative to 100 parts by weight of the thermoplastic polyester resin.

[4] The thermoplastic polyester resin composition according to any one of [1] to [3], wherein the content of the colemanite (D) is 0.1 to 15 parts by weight, relative to 100 parts by weight of the thermoplastic polyester resin (A).

[5] The thermoplastic polyester resin composition according to any one of [1] to [3], wherein the content of the colemanite (D) is 1.5 to 15 parts by weight, relative to 100 parts by weight of the thermoplastic polyester resin (A).

[6] The thermoplastic polyester resin composition according to any one of [1] to [5], further comprising 150 parts by weight or less of a reinforcement filler (E), relative to 100 parts by weight of the thermoplastic polyester resin (A).

[7] The thermoplastic polyester resin composition according to any one of [2] to [6], wherein the organosiloxane (C-a) has a weight-average molecular weight of 200 to 10000.

[8] The thermoplastic polyester resin composition according to any one of [2] to [7], wherein the organosiloxane compound (C-a) comprises a structural unit represented by $RSiO_{1.5}$, wherein R represents an organic group, and comprises hydroxy groups in an amount of 1 to 10% by weight.

[9] The thermoplastic polyester resin composition according to any one of [1] to [8], wherein the thermoplastic polyester resin is polyethylene terephthlate or polybutylene terephthalate.

[10] The thermoplastic polyester resin composition according to any one of [1] to [8], wherein the thermoplastic polyester resin (A) is polybutylene terephthalate.

[11] A molded article formed from the thermoplastic polyester resin composition according to any one of [1] to [10] through injection-molding.

[12] A resin composition of which laser printability was improved, which comprises 100 parts by weight of a thermoplastic polyester resin (A), 0.1 to 2.0 parts by weight of an organosiloxane (C) and 0.01 to 30 parts by weight of a colemanite (D).

[Chemical 3]

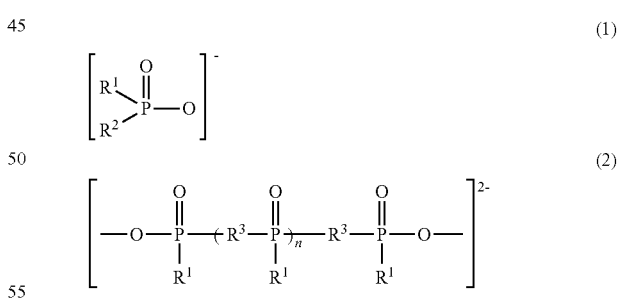

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

[13] A resin composition of which laser printability was improved, which comprises 100 parts by weight of a thermoplastic polyester resin (A) and 0.01 to 30 parts by weight of a colemanite (D).

Effect of the Invention

The invention can provide a thermoplastic polyester resin composition which has high flame resistance, which has high mechanical strength, which is excellent in electronic characteristics, which is decreased in mold deposit, and which is excellent in laser printability. In particular, the invention is remarkably beneficial since the composition is excellent in those characteristics in the balanced manner.

BRIEF DESCRIPTION OF THE DRAWINGS

FIG. 1 shows a schematic view showing a spiral molded article which was formed in the Example of the invention.

EMBODIMENT FOR CARRYING OUT THE INVENTION

Contents of the present invention will be detailed below. Note that a word "... to ..." in this specification will be used to indicate a range including the lower and upper limits represented by the numerals given therebefore and thereafter, respectively.

The thermoplastic polyester resin composition of the invention is characterized by adding 5 to 60 parts by weight of a phosphinate represented by the following formula (1) or (2) (B), 0.1 to 20 parts by weight of an organosiloxane (C), and 0.01 to 30 parts by weight of colemanite (D) into 100 parts by weight of a thermoplastic polyester resin.

[Chemical 4]

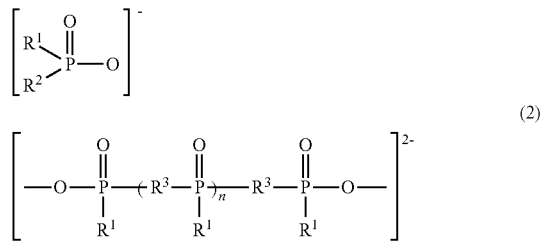

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

By using such a composition, obtainable is a resin composition excellent in mechanical strength while ensuring its flame resistance even if a halogen series flame retardant is substantially used.

Hereinunder, the resin composition of the invention is described in detail.

(A) Thermoplastic Polyester Resin:

The thermoplastic polyester resin (A) which is a main component of the resin composition (1) of the invention is a polyester obtainable through polycondensation of a dicarboxylic acid compound and a dihydroxy compound, polycondensation of oxycarboxylic acid compounds, or polycondensation of a mixture of those compounds, and may be any of homopolyester or copolyester. Examples of the dicarboxylic acid composing the thermoplastic polyester resin include aromatic dicarboxylic acids such as terephthalic acid, isophthalic acid, naphthalene dicarboxylic acid, diphenyldicarboxylic acid, diphenyl ether dicarboxylic acid, and diphenylethanedicarboxylic acid, alicyclic dicarboxylic acids such as cyclohexanedicarboxylic acid, and aliphatic dicarboxylic acids such as adipic acid and sebacic acid.

As those are well-known, those may be used for polycondensation reaction as an ester-forming derivative such as dimethyl ester in addition to a free acid. Examples of the oxycarboxylic acid include parahydroxybenzoic acid, oxynaphthoic acid, and diphenylenehydroxy acid. Those may be subject to polycondensation singly, but generally a small amount of the oxycarboxylic acid is used as a combination with the dicarboxylic acid.

The dihydroxy compound is generally exemplified by aliphatic diols such as ethylene glycol, propylene glycol, butanediol, neopentyl glycol, and polyoxy alkylene glycol, but it may be aromatic diols such as hydroquinone, resorcinol, naphthalenediol, dihydroxydiphenyl ether, and 2,2-bis(4-hydroxyphenyl) propane, and alicyclic diols such as cyclohexanediol.

In addition to such a bifunctional compound, may be used a small amount of a polyfunctional compound having three or more functional groups such as trimellitic acid, trimesic acid, pyromellitic acid, pentaerythritol and trimethylolpropane for introducing a branch structure, or a small amount of monofunctional compound such as fatty acid for adjusting the molecular weight.

In general, the thermoplastic polyester resin for use in the invention is generally composed of a polycondensation mainly consisting of dicarboxylic acid compound and dihydroxy compound, that is, the content of the structure unit based on the calculation of ester composed of the dicarboxylic acid compound and the dihydroxy compound is preferably 70% by weight or more, more preferably 90% by weight or more, relative to a total amount of all the resin. The dicarboxylic acid compound is preferably an aromatic dicarboxylic acid and the dihydroxy compound is preferably an aliphatic diol.

Of those, preferred is a polyalkylene terephthalate in which 95% or more of acid component is terephthalic acid and 95% or more of alcohol component is polyalkylene terephthalate as an aliphatic diol. The typical resin is polybutylene terephthalate and polyethylene terephthalate. In the invention, the resin is preferably polybutylene terephthalate. Those are preferably a near-homoester resin, that is, a resin in which 95% by weight or more component is composed of terephthalic acid component in addition to 1,4-butanediol component or ethylene glycol component.

In the composition of the invention, its glow wire performance can be enhanced by adding polyethylene terephthalate into polyterephthalate without decreasing electric insulating performance.

The inherent viscosity of the thermoplastic polyester resin may be suitably determined, but, in general, is preferably 0.5 to 2 dl/g. Of those, it is more preferably 0.6 to 1.5 dl/g from the viewpoints of the moldability and the mechanical characteristics of the resin composition (1). When the resin composition comprises a resin comprising an inherent viscosity of less than 0.5 dl/g, then a molded article obtained from the resin composition (1) may be poor in mechanical strength. When the resin composition comprises a resin comprising an inherent viscosity of more than 2 dl/g, then the flowability of the resin composition (1) may reduce to decrease the moldability.

In the specification, the inherent viscosity of polyester resin is measured in a mixture solvent of tetrachloroethane and phenol at a ratio by weight of 1:1 at 30° C.

(B) Phosphinate:

The phosphinate for use in the invention is a phosphinate in which the anion part is represented by the formula (1) or (2) and the cation part is preferably calcium or aluminium.

[Chemical 5]

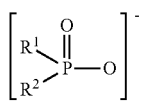
(1)

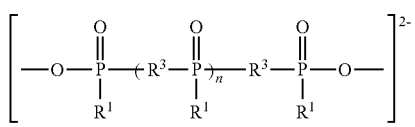
(2)

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

The alkyl group which $R^1$ or $R^2$ may be is exemplified by methyl group, ethyl group, propyl group, isobutyl group and pentyl group, and is preferably an alkyl group having 1 to 4 carbon atoms, especially preferably methyl group or ethyl group. The aryl group is exemplified by phenyl group and naphthyl group, and the substituent bonded thereto is exemplified by an alkyl group having 1 to 4 carbon atoms or an alkoxy group having 1 to 4 carbon atoms such as methyl group, ethyl group, methoxy group and ethoxy group.

The number of the substituent to be bonded is generally 1 to 2. The aryl group is preferably a phenyl group to which one or two of alkyl groups having 1 to 2 carbon atoms may be bonded.

The alkylene group which $R^3$ may be is exemplified by linear alkylene groups such as methylene group, ethylene group, propylene group and butylene group, and branched alkylene groups such as 2-ethylhexylene. Of those, more preferable is an alkylene group having 1 to 4 carbon atoms, especially methylene group or ethylene group.

The arylene group is exemplified by phenylene group and naphthylene group, and the substituent bonded thereto is the same as those as above mentioned. The number of the substituent to be bonded is generally 1. The arylene group is preferably a phenylene group to which one or two of alkyl groups having 1 to 2 carbon atoms are bonded. The combination of at least two thereof is exemplified by a group in which methylene group bonds to phenylene group, a group in which two phenylene groups bond to methylene group, and a group in which two methylene groups bond to phenylene group.

In the invention, of those, the above mentioned phosphinate is preferably a calcium salt or an aluminium salt of phosphine acid of which the anion part is represented by the following formula (1') or (2').

[Chemical 6]

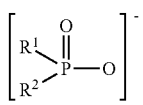
(1')

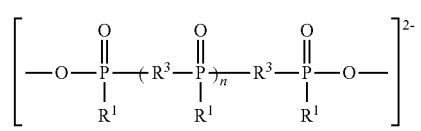
(2')

wherein $R^1$'s and $R^2$ each independently are an alkyl group having 1 to 6 carbon atoms, or an aryl group which may have a substituent; $R^1$'s may be the same or different to each other; $R^3$'s are an alkylene group having 1 to 10 carbon atoms, an arylene group which may have a substituent, or a combination of at least two thereof; $R^3$'s may be the same or different to each other; and n is an integer of 0 to 4.

The content of the phosphinate is 5 to 60 parts by weight, relative to 100 parts by weight of the thermoplastic polyester resin (A). When the content thereof is less than 5 parts by weight, then it is difficult to sufficiently enhance the flame resistance of the resin composition. When the content thereof is more than 60 parts by weight, the mechanical performances reduce or the mold deposit increases. In view of achieving both of the flame resistance and mechanical properties, the content thereof is preferably 10 to 50 parts by weight, more preferably 15 to 45 parts by weight, further more preferably 20 to 45 parts by weight.

The phosphinate preferably used in the invention has the anion part represented by the formula (1'), and is exemplified by calcium dimethyl phosphinate, aluminium dimethyl phosphinate, calcium ethylmethyl phosphinate, aluminium ethylmethyl phosphinate, calcium diethyl phosphinate, aluminium diethyl phosphinate, methyl-n-propyl calcium phosphinate, methyl-n-propyl aluminium phosphinate, calcium methylphenyl phosphinate, aluminium methylphenyl phosphinate, and aluminium diisobutyl phosphinate.

The phosphinate in which the anion part is represented by the formula (2') is preferably the anion part in which n=0 in the formula (2') and is exemplified by calciummethylenebis (methylphosphinic acid), aluminium methylenebis(methylphosphinic acid), calcium phenylene-1,4-bis(methylphosphinic acid), and aluminium phenylene-1,4-bis (methylphosphinic acid).

The phosphinate for use in the invention may be used singly or in combination of two or more kinds thereof at a desired ratio. Specifically, of those, more preferable is an aluminium or calcium salt of diethyl phosphine acid from the viewpoints of the flame resistance and the electric characteristics. From the viewpoints of the mechanical strength and the appearance of the molded article obtained from the resin composition (1) of the invention, the phosphinate for use in the invention is preferably in the form of powder, and 90% by weight or more of the phosphinate in the form of powder has a particle diameter of 100 μm or less, especially 50 μm or less. Of those, 90% by weight or more of the phosphinate in the form of powder has a particle diameter of 0.5 to 20 μm is particularly preferable since the resin composition exerts the flame resistance at a higher degree, and the molded article obtained therefrom has extremely high toughness. The particle diameter is the value measured according to the laser diffractometry.

(C) Organosiloxane

The resin composition of the invention comprises 0.1 to 20 parts by weight of the following organoxiloxane (C-a) and/or (C-b), relative to 100 parts by weight of the thermoplastic polyester resin.

(C-a) an organosiloxane compound comprising organic groups bonding to a silicon atom directly or through an oxygen atom, wherein 40 mole % of the organic groups are an aryl group.

(C-b) an organosiloxane polymer in the form of solid at 25° C.

The organosiloxne may be an organosiloxane satisfying the both of (C-a) and (C-b), and is preferably an organosiloxane satisfying at least (C-a).

The content of the organosiloxane is preferably 0.1 to 17 parts by weight, more preferably 1.5 to 10 parts by weight, further more preferably 2 to 7 parts by weight, relative to 100 parts by weight of the thermoplastic polyester resin. When the content thereof is small, then the composition may not exert a desired flame resistance. When the content there of is too large, the flame resistance deduces. It is believed that, when the resin composition comprises the organosiloxane at a larger amount and burns, the evaporated organosiloxane compound itself burns to decrease the flame resistance of the composition.

(C-a) Organosiloxane Compound

The thermoplastic polyester resin composition of the invention indispensably comprises an organosiloxane compound having an aryl group. The organosiloxane compound functions as a flame retardant which imparts the thermoplastic resin composition with high flame resistance when it is used in combination with the above mentioned phosphinate.

One of functional mechanisms is believed that, when the resin composition (1) is burned, the organosiloxane compound therein vaporizes to form many minute air bubbles in the resin composition and the air bubbles prevent the resin composition from further burning by its heat insulating function.

The organosiloxane compound for use in the invention is an organic silanol or a polymer obtained from the organic silanol, wherein 40 mole % or more, preferably 50 mole % or more, of the organic groups bonding to a silicon atom directly or through an oxygen atom, that is, the organic group constituting Si—C or Si—O—C bond has an aryl group. The aryl group is exemplified by phenyl group or naphthyl group which may be substituted with 1 to 2 of alkyl groups having 1 to 4 carbon atoms or alkoxy groups having 1 to 4 carbon atoms such as methyl group, ethyl group, methoxy group and ethoxy group. Of those, the aryl group is preferably a phenyl group.

In general, the resin composition comprising the organosiloxane compound readily causes dripping during burning, but the resin composition comprising the organosiloxane compound in which 40 mole % or more of the organic groups are an alkyl group hardly causes the dripping during burning, and the burning is suppressed to a large degree. Those functions that the organosiloxane compound has are generally more effective when the content of the aryl group in the organic group is higher. Thus, the organosiloxane compound is preferably an organosiloxane in which 80 mole % of the organic groups are an aryl group, further preferably an organosiloxane in which all (100%) of the organic groups are an aryl group. particularly, a phenyl group.

As the organosiloxane compound, may be usable any of monomers such as triphenylsilanol, oligomers as cyclic tetrameric of the monomers such as octaphenyltetrasiloxane or polymers such as polydiphenylsiloxane. Some of the phenyl groups may be substituted with methyl group or another alkyl group, methoxy group or another alkoxy group, or phenoxy group or another aryloxy group.

Further, the phenyl group may be substituted in its part with hydroxy group. However, when the content of the hydroxy group in the organosiloxane compound is too large, then it readily hydrolyzes under high temperature and high humidity. Therefore, the content of the hydroxy group therein is preferably 1 to 10% by weight.

As mentioned above, the organosiloxane compound may be a monomer or an oligomer. However, since the organosiloxane compound having a low molecular weight readily causes mold deposit, it is preferably a polymer having a weight-average molecular weight of 200 or more, more preferably 800 or more, particularly preferably 1000 or more. When the molecular weight thereof is too large, then it may be difficult to prepare a uniform resin composition since its compatibility with the polyester resin reduces. Thus, the weight-average molecular weight thereof is preferably 10000 or less, more preferably 5000 or less. Herein, the weight-average molecular weight is a value in terms of polystyrene measured according to the gel permeation chromatography (GPC).

Of the organosiloxane compound, particularly preferred is, as it is called, a silicone resin. The silicone resin is generally a polymer composed of the following D unit, T unit, Q unit or the like. The terminal thereof may be sealed with the following M unit.

[Chemical 7]

(3)

$$M \quad R-\underset{\underset{R}{|}}{\overset{\overset{R}{|}}{Si}}-O- \quad R_3SiO_{0.5}$$

[Chemical 8]

(4)

$$D \quad -O-\underset{\underset{R}{|}}{\overset{\overset{R}{|}}{Si}}-O- \quad R_2SiO_{1.0}$$

[Chemical 9]

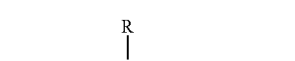

(5)

$$T \quad -O-\underset{\underset{O}{|}}{\overset{\overset{R}{|}}{Si}}-O- \quad RSiO_{1.5}$$

[Chemical 10]

(6)

$$Q \quad -O-\underset{\underset{O}{|}}{\overset{\overset{O}{|}}{Si}}-O- \quad SiO_{2.0}$$

The silicone resin for use in the invention preferably comprises the T unit represented by $RSiO_{1.5}$. In particular, the content of the T unit in the silicone resin is preferably larger, and is preferably 50 mole % or more, further preferably 80 mole % or more. Particularly preferably, the silicone resin consists of only the T unit except a terminal-blocking group.

In general, for a silicone resin comprising a smaller amount of the T unit, the heat resistance itself is lower and the dispersibility in the resin composition is lower. The content ratio of the T unit is a value measured according to $^{29}$Si—NMR, that is, a value calculated from a peak area derived from the T unit in the measurement.

In the formulae (3) to (6), R's represent a monovalent hydrocarbon group having 1 to 12 carbon atoms. R's may be the same or different to each other, and is generally an alkyl group having 1 to 12 carbon atoms, an alkenyl group having 2 to 12 carbon atoms, or an aryl group having 6 to 12 carbon atoms.

Examples of the alkyl group include methyl group, ethyl group, n-propyl group, isopropyl group, butyl group, hexyl group, octyl group, and dodecyl group. Of those, preferred is methyl group. Examples of the alkenyl group include vinyl group, butenyl group, and aryl group. Examples of the aryl group include phenyl group, biphenyl group, naphthyl group, and tolyl group. Of those, preferred is phenyl group. To the aryl group, may be bonded to one or two of alkyl groups having 1 to 4 carbon atoms or alkoxy groups having 1 to 4 carbon atoms such as methyl group, ethyl group, methoxy group, or ethoxy group.

In the above formula, the oxygen atom in Si—O— bonds to a hydrogen atom or a hydrocarbon group to form a hydroxyl group or a hydrocarbonoxy group, or two Si—O v's bond to form a Si—O—Si bond. The hydrocarbon group bonding to the oxygen atom is exemplified by the hydrocarbon groups which are the same as R in the above formula.

In the invention, of the above mentioned silicone resin, silicon resin in which 40 mole % or more, preferably 50 mole % or more, of the organic groups bonding to a silicon atom directly or through an oxygen atom is preferable, that is, the organic group forming Si—C or Si—O—C bond is an aryl group which may have a substituent, preferably a phenyl group, is preferable.

When the content of the aryl group therein is less than 40 mole %, then the silicone resin has low compatibility with the thermoplastic resin, and therefore, the obtained resin composition may not have a desired high flame resistance. Thus, the content of the aryl group in the organic group is preferably 80 mole % or more, more preferably 100 mole % or more. The content of the aryl group may be measured according to $^{29}$Si—NMR, and may be calculated from a peak area derived from aryl-Si and Si—O-aryl.

The flame resistance of the silicone resin may be improved by comprising a small amount of hydroxy group. The content of hydroxy group is preferably 1 to 10% by weight, preferably 2 to 8% by weight, to the total amount of the silicone resin. The silicone resin may be used singly or in combination of two or more kinds thereof at a desired ratio.

(C-b) Organosiloxane Polymer in the Form of Solid at 25° C.

The organosiloxane polymer means a polymer obtained from organosiloxane compounds or a copolymer obtained from an organosiloxane compound with a compound capable of reacting therewith (a vinyl compound, a carbonate compound, or the like). The form of solid at 25° C. means that a compound does not flow as liquid at 25° C. and can be handled as solid. Examples thereof include the following (C-b-1) to (C-b-4).

(C-b-1) An organosiloxane-supported inorganic particle
(C-b-2) A chain type-organosiloxane polymer having a softening point of higher than 25° C.
(C-b-3) A cross-linked-organosiloxane polymer
(C-b-4) A polyorganosiloxane core graft copolymer
(C-b-1) Organosiloxane-Supported Inorganic Particle (Hereinunder, May be Referred as Supported Polymer)

The inorganic particle is exemplified by silica powder, titanium oxide powder, mica powder, clay powder, kaoline powder, magnesium hydroxide powder and aluminium hydroxide powder, and is preferably silica powder. The silica powder includes dry-way silica and wet-way silica and both thereof may be used.

The inorganic particles preferably have a particle diameter of 0.01 to 100 μm, particularly preferably 0.01 to 30 μm at the ratio of 90% by weigh thereof, when measured according to the laser diffractometry. Of those, the inorganic particles are preferably powders having a specific surface area of 50 m$^2$/g or more, more preferably 100 m$^2$/g or more. The inorganic particles may be treated with a surface treatment agent such as a silane coupling agent, and such a treatment may further strengthen the bond with the organosiloxane polymer. When the polymer has an epoxy group or a methacryl group, then the bond may be further strengthened.

The organosiloxane polymer may be a polymer of organosiloxane compounds or a copolymer having a carbon chain as a copolymerization component in the molecular chain. The copolymerization component is exemplified by a saturated or unsaturated chain hydrocarbon group having carbon atoms of 1 to 20, a halogenated hydrocarbon group, an alicyclic hydrocarbon group and an aromatic hydrocarbon group. The organosiloxane polymer may have a functional group.

The functional group is preferably methacryl group or epoxy group. The polymer having those functional groups has good compatibility with the thermoplastic polyester resin, and therefore, it may be effective for improving the toughness. In addition, since the functional groups can cause a cross-linking reaction with the polyester resin during burning, decrease of the flame resistance is suppressed. The organosiloxane polymer may be linear or branched, and is preferably linear.

The content of the functional groups in the organosiloxane polymer is generally about 0.01 to 1 mole %, preferably 0.03 to 0.5 mole %, more preferably 0.05 to 0.3 mole %. The method for supporting the organosiloxane to the inorganic particle is suitably selected. For example, the method may comprise dissolving the polymer in a solvent, impregnating the inorganic particles into the polymer solution, and then drying it. The content to be supported of the organosiloxane is generally 0.1 to 10 g, preferably 0.4 to 4 g, relative to 1 g of the inorganic particles.

When the organosiloxane is supported by using, as an adhesion promoter, an alkoxy silane having a functional group such as an epoxy group and the like, then the bond between the inorganic particles and the polymer is further strengthened. The bond between the inorganic particles and the polymer may be merely a physical bond or a bond due to a chemical reaction. It is believed that the polymer supported by the inorganic particles forms a milder form of cross-link structure with the thermoplastic polyester resin through synergic action with the inorganic particles, and that the cross-link structure contributes improvement of both of the toughness thereof and the flame resistance thereof.

The supported polymer is preferably a supported polymer in which an organosiloxane polymer is supported on silica. Commercial products thereof include "Si powder" and "Torayfil F" manufactured by Dow Corning Toray Corporation.

(C-b-2) Organosiloxane Polymer Having a Softening Point of 25° C. or More

The typical organosiloxane polymer having a softening point of higher than 25° C. is, so-called, silicone resin, and the composition thereof is presented by the following formula (3)

$$(R^1SiO_{3/2})_a(R^2{}_2SiO_{2/2})_b(R^3{}_3SiO_{1/2})_c(SiO_{4/2})_d(XO_{1/2})_e \quad (3)$$

In the formula (3), X is hydrogen atom or an alkyl group such as methyl group, ethyl group, propyl group, butyl group, pentyl group, hexyl group and heptyl group. $R^1$, $R^2$, and $R^3$ may be different to each other, and is preferably a hydrocarbon group or an organic group containing an epoxy group.

Examples of the hydrocarbon group include alkyl groups such as methyl group, ethyl group, propyl group, butyl group, pentyl group, hexyl group and heptyl group; alkenyl groups such as vinyl group, allyl group, butenyl group, pentenyl group and hexenyl group; aryl groups such as phenyl group, tolyl group, xylyl group and naphthyl group; aralkyl groups such as benzyl group and phenethyl group; and halogenated alkyl groups such as chloromethyl group, 3-chloropropyl group, 3,3,3-trifluoropropyl group and nonafluorobutylethyl group.

Examples of the organic group containing an epoxy group include epoxy alkyl groups such as 2,3-epoxypropyl group, 3,4-epoxy butyl group, and 4,5-epoxy pentyl group; glycidoxy alkyl groups such as 2-glycidoxy ethyl group, 3-glycidoxy propyl group, and 4-glycidoxy butyl group; epoxycycloalkyl groups such as 2-(3,4-epoxy cyclohexyl)ethyl group and 3-(3,4-epoxycyclohexyl)propyl group. Although the organic group containing an epoxy group is not essential, the content of the organic group containing an epoxy group in a total of $R^1$ to $R^3$ in the formula (3) is preferably 0.1 to 40 mole %.

When the content thereof is less than 0.1 mole %, then the bleeding-out tends to easily occur at the time when the thus-obtained resin composition is molded. When the content thereof is more than 40 mole %, then mechanical characteristic of the molded article tends to reduce.

When $R^1$, $R^2$, or $R^3$ has a phenyl group, the organosiloxane is excellent in affinity for the thermoplastic polyester resin. Therefore, 10 more % or more of all of $R^1$, $R^2$, and $R^3$ in the formula (3) are preferably phenyl group. Of those, 10 mole % or more of $R^1$ is preferably phenyl group, and 30 mole % or more of $R^1$ is particularly preferably phenyl group.

Further, the flame resistance thereof is enhanced by relaxing the steric hiderance of the organopolysiloxane containing a phenyl group, which has a large size, to enhance spatial freedom thereof, and thereby easily overlapping every phenyl groups. Therefore, $R^1$ in the formula (3) preferably has methyl group or vinyl group. The ratio of phenyl group in $R^1$ is preferably 10 to 95 mole %, more preferably 30 to 90 mole %.

In the formula (3), a is a positive number, b, c, d and e each are 0 or a positive number. b/a is a number of 0 to 10, c/a is a number of 0 to 0.5, d/(a+b+c+d) is a number of 0 to 0.3, e/(a+b+c+d) is a number of 0 to 0.4. A silicone resin having b/a of more than 10 has a softening point of 25° C. or less. The affinity thereof for the resin reduces. A silicon resin having d/(a+b+c+d) of more than 0.3 tends to decrease the dispersibility to the resin.

The weight-average molecular weight of the organopolysiloxane is preferably 500 to 50000, particularly preferably 500 to 10,000. The softening point thereof is 25° C. or more, preferably 40 to 250° C., more preferably 40 to 150° C. Use of the silicone resin having a softening point of less than 25° C. tends to cause bleeding to pollute the mold at the time of molding of the resin composition obtained by mixing it, or to decrease the mechanical characteristics of the molded articles. Or the silicone resin tends to bleed out on a surface of the molded article during long use of the molded article.

Use of the silicon resin having a too high softening point tends to make difficult uniform dispersion of the resin composition at the preparation of the resin composition. The softening point is determined as a temperature at which silicone resin is heated at a rate of temperature increase of 1° C./min using the micro softening point apparatus manufactured by Yanagimoto Mfg. Co., Ltd. and melts to change droplets.

The silicone resin represented by the formula (1) may, for example, be formed by reacting a mixture of one or more kinds of silane or siloxane with an epoxy group-containing alkoxy silane or its partial hydrolysate with a basic catalyst, wherein the silane or siloxane comprises at leas one unit selected from the group consisting of the unit represented by the formula (1): $R^4SiO_{3/2}$, wherein $R^4$ is a monovalence hydrocarbon group.), the unit represented by the formula (ii): $R^5_2SiO_{2/2}$, wherein $R^5$'s are a monovalent hydrocarbon group, and may be the same or different to each other), the unit represented by the formula (iii): $R^6_3SiO_{1/2}$, wherein $R^6$'s are a monovalent hydrocarbon group, and may be the same or different to each other), and the unit represented by the formula (Iv): $SiO_{4/2}$; and the epoxy group-containing alkoxy silane is represented by the formula: $R^7R^8_f Si(OR^9)_{(3-f)}$, wherein $R^7$ is an epoxy group-containing organic group, $R^8$ is a monovalent hydrocarbon group, $R^9$ is an alkyl group, and f is 0, 1 or 2.

In the above method, the main component is a mixture of one or more kinds of silane or siloxane comprising at least one unit selected from the group consisting of the units represented by the above-mentioned (i) to (iv).

Examples of those silane or siloxane include methyltrimethoxy silane, methyltriethoxysilane, ethyltrimethoxysilane, ethyltriethoxysilane, vinyltrimethoxysilane, phenyltrimethoxysilane, 3,3,3-trifluoropropyltrimethoxysilane, dimethyldimethoxysilane, methylphenyldimethoxysilane, methylvinyldimethoxysilane, diphenyldimethoxysilane, dimethyldiethoxysilane, methylphenyldiethoxysilane, tetramethoxysilane, tetraethoxysilane, tetrapropoxysilane, dimethoxydiethoxysilane and hydrolyzed condensation thereof.

The epoxy group-containing alkoxy silane is represented by the formula: $R^7R^8_f Si(OR^9)_{(3-f)}$ which is copolymerized with those silane or siloxane or its partial hydrolysate is a component which incorporates an epoxy group into silicone resin. $R^7$ in the formula is an epoxy group-containing organic group, and is exemplified by the same epoxy group-containing organic groups as the above-mentioned $R^1$, $R^2$, or $R^3$.

$R^8$ in the formula is a monovalent hydrocarbon group and is exemplified by the same epoxy group-containing organic group as the above-mentioned $R^1$, $R^2$, or $R^3$. $R^9$ is an alkyl group, and is exemplified by methyl group, ethyl group, propyl group, butyl group, pentyl group, hexyl group, and heptyl group. In the formula, f is 0, 1, or 2, preferably 0.

The epoxy group-containing alkoxy silane is exemplified by 3-glycidyloxypropyl(methyl)dimethoxy silane, 3-glycidyloxypropyl(methyl) diethoxy silane, 3-glycidoxypropyl (methyl)dibutoxy silane, 2-(3,4-epoxycyclohexyl)ethyl(methyl)dimethoxysilane, 2-(3,4-epoxy cyclohexyl)ethyl (phenyl)diethoxysilane, 2,3-epoxypropyl(methyl) dimethoxysilane, 2,3-epoxypropyl(phenyl) dimethoxysilane, 3-glycidyloxypropyltrimethoxysilane, 3-glycidyloxypropyl tributoxysilane, 2-(3,4-epoxycyclohexyl)ethyltrimethoxy silane, 2-(3,4-epoxycyclohexyl)ethyltriethoxy silane, 2,3-epoxypropyltrimethoxy silane, and 2,3-epoxypropyltriethoxy silane.

Examples of the basic catalyst include hydroxides of an alkali metal such as sodium hydroxide, potassium hydroxide, and cesium hydroxide; alkoxides of an alkali metal such as sodium tert-butoxide, potassium tert-butoxide, and cesium tert-butoxide; and silanol compounds of alkali metal such as sodium silanol compound, potassium silanol compound, and cesium silanol compound. Preferably used are a potassium series or cesium series basic catalyst. In the reaction, water may be added if necessary.

In the reaction, an equilibrating reaction randomly causes cut and recombination between siloxane bonds, and as a result, the obtained epoxy group-containing silicone resin becomes an equilibrium state. When the reaction temperature is low, then the equilibrating reaction may not sufficiently progress. When the reaction temperature is too high, then the silicon atom-bonding organic group may be pyrolyzed. Therefore, the reaction temperature is preferably 80° C. to 200° C., more preferably 100° C. to 150° C.

By selecting an organic solvent having a boiling point of 80 to 200° C., the equilibrating reaction can easily be progressed at the reflux temperature thereof. The equilibrating reaction can be stopped by neutralizing the basic catalyst. For the neutralization, a weak acid such as carbon dioxide or carboxylic acid is preferably added thereto. The salt formed by the neutralization may be removed by filtering it or washing it with water.

(C-b-3) Cross-Linked Organosiloxane Polymer

The cross-linked organosiloxane is a so-called silicone elastomer which may be synthesized by curing it through an addition reaction, a condensation reaction, a radical reaction due to organic peroxide or an ultraviolet irradiation. Of those, preferred is a silicone elastomer cured through an addition reaction or a condensation reaction. More preferred is an addition reaction-cure-type silicone elastomer.

The addition reaction-cure-type silicone elastomer composition is a composition in which the elastomer is formed by bonding two kinds of functional groups in the organopolysiloxane to each other through an addition reaction to thereby form a cross-link. The typical examples thereof include a silicon elastomer composition comprising organopolysiloxane or organohydropolysiloxane containing an aliphatic unsaturated group such as vinyl group or hexynyl group, and a platinum group compound series catalyst.

Examples of the aliphatic unsaturated group-containing organopolysiloxane include dimethylpolysiloxane having vinyldimethylsiloxy groups at the both molecular chain terminals, dimethylsiloxane/methlvinylsiloxane copolymer having vinyldimethylsiloxy groups at the both molecular chain terminals, and dimethylsiloxane/methlphenylsiloxane copolymer having vinyl methylphenylsiloxy groups at the both molecular chain terminals.

Examples of organohydrogenpolysiloxanes include methylhydrogenpolysiloxane having trimethylsiloxy groups at the both molecular chain terminals, dimethylsiloxane/methylhydrogenpolysiloxane copolymer having trimethylsiloxy groups at the both molecular chain terminals, dimethylsiloxane/methylhydrogensiloxane copolymer having dimethylhydrogensiloxy groups at the both molecular chain terminals, and methyhydrogenpolysiloxane.

Examples of the platinum group compound series catalyst include platinum in the particle form, chloroplatinic acid, a complex of platinum and olefin, a complex of platinum and a vinyl siloxane, a complex of platinum and a diketone, a palladium compound catalyst and a rhodium compound catalyst. Of those, preferred is a platinum compound series catalyst from the viewpoint of the catalyst activity. The addition reaction-cure-type silicone elastomer composition is generally cured by heating from the viewpoints of the curability and the productivity. Examples of other addition reaction-cure-type silicone elastomer composition include a composition comprising organopolysiloxane containing an aliphatic unsaturated group such as vinyl group and organopolysiloxane containing mercaptoalkyl group, which is cured through ultraviolet irradiation or electron ray irradiation.

In the condensation reaction-cure-type silicone elastomer composition, an elastomer is formed by bonding two kinds of functional groups in organosiloxane to each other, or by bonding a functional group in organosiloxane with a functional group in a silicone compound such as silica and silane, to thereby form a cross-link through the condensation reaction. Examples of the condensation reaction-cure-type silicone elastomer composition include dehydrogenation condensation type, dehydration condensation type, deacecylation condensation type, deoxime condensation type, dealcoholization condensation type, deamidation condensation type, dehydroxylamination condensation type, and deacetone condensation type.

Typical examples of the dehydrogenation condensation reaction cure-type silicone elastomer composition include a composition comprising diorganopolysiloxane having silanol groups at the both molecular chain terminals, organohydrogenpolysiloxane and a condensation reaction catalyst such as a heavy-metal salt of an organic acid. The diorganopolysiloxane having silanol groups at the both molecular chain terminals is exemplified by dimethylpolysiloxane having silanol groups at the both molecular chain terminals, dimethylsiloxane/methylphenylsiloxane copolymer having silanol groups at the both molecular chain terminals, and methyl(3,3,3-trifluoropropyl)polysiloxane having silanol groups at the both molecular chain terminals. In the diorganopolysiloxane, the terminal silanol group may be partially converted to an alkoxy group in order to suppress the condensation reaction.

The organohydrogenpolysiloxane as a cross-linker is exemplified by dimethylsiloxane/methylhydrogensiloxane copolymer having dimethylhydrogensiloxy groups at the both molecular chain terminals, methylhydrogensiloxane having trimethylsiloxy groups at the both molecular chain terminals, and methylhydrogencyclosiloxane. Examples of the condensation reaction catalyst include dibutyltin dilaurate, dibutyltin diacetate, tin octanoate, dibutyltin dioctoate, tin laurate, ferric stannooctanoate, lead octanoate, lead laurate, and zinc octanoate.

While the above dehydrogenation condensation reaction cure-type silicone elastomer composition is need to be cured by heating from the viewpoints of the curability and the productivity, the dehydration condensation type, the deacecylation type condensation, the deoxime type condensation, the dealcoholization type condensation, the deamidation type condensation, the dehydroxylamination type condensation, and the deacetone type condensation may form a elastomer by curing it at room temperature under humidity. Of the moisture-curable silicone elastomer compositions, a silicone-water based elastomer, which may form an elastomer by removing water, is particularly useful.

As the silicone-water based elastomer, generally used is an aqueous organopolysiloxane emulsion composition comprising (a) substantively linear polyorganosiloxane having at least two silanol groups in one molecule, (b) a cross-linker selected from the group consisting of a colloidal silica, an alkali metal silicate, a hydrolyzable silane and its partial hydrolyzed condensation, (c) a curing catalyst, (d) an emulsifier and (e) water.

The organopolysiloxane as the ingredient (a) forms a cross-link therebetween by the function of the (b) ingredient to be a rubber elastic body, which is a polymer having at least two silanol groups in one molecule. The position of the silanol groups is not specifically limited. However, the silanol groups are preferably positioned at the both molecular chain terminals. The organic group to bond to silicon atom other than the silicon atom contained in a silanol group is preferably a non-substituted or substituted monovalent hydrocarbon group, and is exemplified by an alkyl group such as methyl group, ethyl group, propyl group and butyl group, an alkenyl group such as vinyl group and allyl group, an aryl group such as phenyl group, an aralkyl group such as benzyl group, an alkaryl group such as styryl group and tolyl group, an cycloalkyl group such as cyclohexyl group and cyclopentyl group.

In those groups, part or all of the hydrogen atoms may be substituted with a halogen atom such as fluorine, chlorine or bromine. Such a group is exemplified by 3-chloropropyl group and 3,3,3-trifluoropropyl group. Of those, preferred is methyl group, vinyl group and phenyl group, and particularly preferred is methyl group. However, all of the groups are not necessarily the same to each other, and different kinds of the monovalent hydrocarbon groups may be combined with each other. Substantively, the linear means that it may be a linear comprising a branched chain in part thereof.

The molecular weight of the organopolysiloxane is not specifically limited, and is preferably 5000 or more. This is because reasonable tensile strength and stretch can be imparted by organopolysiloxane having a molecular weight of 3000 or more, but the most preferable tensile strength and stretch can not be imparted unless the organopolysiloxane has a molecular weight of 500 or more. However, the molecular weight thereof is preferably 1000000 or less from the viewpoints of possibility of emulsifying emulsion.

Specific examples of the organopolysiloxane include dimethylpolysiloxane, methylphenylpolysiloxane, dimethylsiloxane/methylphenylsiloxane copolymer, methylvinylpolysiloxane, and dimethlsiloxane/methylvinylsiloxane copolymer which contain silanol groups at both molecular chain terminals. The organopolysiloxane may be synthesized according to a method comprising subjecting a cyclic or branched organopolysiloxane to hydrolytic condensation, or a method comprising hydrolyzing one or more kinds of diorganodihalogenosilane.

The cross-linker as the ingredient (b) functions as a cross-linking ingredient in the (a) ingredient, and is exemplified by colloidal silica, alkali metal silicate salt, and a hydrolyzable silane and its partial hydrolyzed condensation. The colloidal silica is exemplified by a fumy colloidal silica, a precipitated colloidal silica, and a colloidal silica having a diameter of 0.0001 to 0.1 μm which was stabilized by sodium ion, ammonium ion or aluminium ion. The content of the colloidal silica is preferably 1 to 150 parts by weight, more preferably 1 to 70 parts by weight, relative to 100 parts by weight of the organopolysiloxane as the ingredient (a).

The alkaline metal silicate salt is exemplified by lithium silicate, sodium silicate, potassium silicate and rubidium silicate. The amount to be added of the alkaline metal silicate is preferably 0.3 to 30 parts by weight, more preferably 0.3 to 20 parts by weight, relative to 100 parts by weight of the organopolysiloxane as the ingredient (a). The hydrolyzable silane for use herein is a silane having at least three hydrolysable groups bonding to the silicon atom in the molecular. This is because the silane having less than three hydrolysable groups does not give an elastomer.

Examples of the hydrolysable group include alkoxy groups such as methoxy group, ethoxy group, and butoxy group; acyloxy groups such as acetoxy group; substituted or non-substituted acetamide groups such as acetamide group, and N-methylacetamide group; alkenyloxy groups such as propenoxy group; substituted amino groups such as N,N-diethylamino group; and ketoxime groups such as methylethylketoxime group.

Specific examples thereof include methyltrimethoxysilane, vinyltrimethoxysilane, normal propylorthosilicate, ethylpolysilicate, propylpolysilicate, methyltir(propanoxy)silane, and methyltri(methylethylketooxime)silane. Two or more kinds of the silanes may be used in combination therewith. The content of the hydrolyzable silane and its partial hydrolyzed condensation is preferably 1 to 150 parts by weight, relative to 100 parts by weight of the organopolysiloxane as the ingredient (a).

The curing catalyst (c) is an ingredient that promotes the condensation reaction between the polyorganosilixoane as (a) ingredient and the cross-linker as (b) ingredient, and is exemplified by organic acids metal salts such as dibutyltin dilaurate, dibutyltin diacetate, tin octanoate, dibutyltin dioctoate, tin laurate, ferric stannooctanoate, lead octanoate, lead laurate, and zinc octanoate; titanate esters such as tetrabutyl titanate, tetrapropyl titanate and dibutoxytitanium bis(ethyl acetoacetate); and amine compounds such as n-hexylamine, guanidine and hydrochloric acids thereof.

Preferably, those curing catalysts are preliminarily prepared to be in the form of emulsion by using an emulsifier and water according to a conventional method. The content of the curing catalyst is preferably 0.01 to 1.5 parts by weight, more preferably 0.05 to 1 parts by weight, relative to 100 parts by weight of the organopolysiloxane as the ingredient (a).

The emulsifier as the ingredient (d) is an ingredient for mainly emulsifying the organopolysiloxane as the ingredient (a), and is exemplified by anion series emulsifiers, nonionic series emulsifiers, and cation series emulsifiers. Examples of the anion series emulsifier include high fatty acid salts, high alcohol sulfonate, alkylbenzene sulfonate, alkylnaphtalene sulfonate, alkylphosphinates, and polyethyleneglycol sulfate salt.

Examples of the nonionic series emulsifier include polyoxyethylenealkylphenylethers, sorbitan fatty acid esters, polyoxyethylenesorbitan fatty acid esters, polyoxyalkylene fatty acid esters, polyoxyethylenepolyoxypropylenes, and monoglyceride-fatty acids.

Examples of the cation series emulsifier include aliphatic amine salts, quaternary ammonium salts, and alkylpyridinium salts. The emulsifier may be used singly or in combination thereof. The content of the emulsifier is preferably 2 to 30 parts by weight, relative to 100 parts by weight of the organopolysiloxane as the ingredient (a).

The content of the ingredient (e) is not specifically limited as long as the amount may be enough for preparing the aqueous emulsion by emulsifying the organopolysiloxane as the ingredient (a), the cross-linker as the ingredient (b), and the curing catalyst as the ingredient (c) through the function of the emulsifier as the ingredient (d).

The emulsion of the silicone water based elastomer may be prepared by uniformly mixing the above (a) to (e) ingredients. It is exemplified by a method comprising subjecting dimethylpolysiloxane having silanol groups at the both molecular chain terminals to emulsification into water in the presence of an emulsifier using an emulsification equipment such as homo mixer, homogenizer, and colloidal mill, and then, adding a cross-linker such as a colloidal silica, or a curing catalyst, or a method comprising subjecting the mixture to emulsification into water by using a cyclic diorganopolysiloxane such as octamethyltetrasiloxane, and then, adding a ring-opening polymerization catalyst and polymerizing it under heating to prepare an emulsion of dimethylpolysiloxane having silanol groups at the both molecular chain terminals, adding a cross-linker such as a colloidal silica, or a curing catalyst, and mixing the resulting emulsion.

Further, an emulsion which is extremely excellent in preservation stability may be obtained by preparing a base emulsion consisting of the ingredients (a) to (e), and then, preparing its pH to 9 to 12. The pH regulator for use herein is exemplified by amines such as dimethylamine and ethylenediamine, and hydroxides of alkaline metal such as sodium hydroxide and potassium hydroxide. Of those, preferred is an organic amine. The organic amine other than the above mentioned organic amines is exemplified by monoethanolamine, triethanolamine, morpholine and 2-amino-2-methyl-1-propanol. After thus the pH was adjusted, it is preferably ripened at given temperature for given period of time.

The ripening temperature is preferably the temperature at which the emulsion is not broken down, that is, in the range of 10 to 60° C., particularly preferably in the range of 15 to 50° C. The ripening period of time is suitably defined depending on the ripening temperature, and is, for example, one week or more at the temperature condition of 25° C., preferably 4 days or more at the temperature condition of 40° C.

Thus-obtained organopolysiloxane emulsion is excellent in preservation stability at room temperature, and can be readily cured by removing moisture, and thereby, be in the form of elastomer. When it does not need to have preservation stability at room temperature, the base emulsion may have a pH of less than 9. To the organopolysiloxan emulsion, another ingredient which is exemplified by fillers, gums, pigments, dyes, heat resistance agents, antiseptics, and co-penetrants such as ammonia water, may be suitably added and mixed.

In the case where the colloidal silica is not used as the cross-linker as the ingredient (b), the organopolysiloxane emulsion becomes poor in viscid, and therefore, a thick elastomer is hardly obtained. Thus, the filler such as fine powder quartz, calcium carbonate, magnesium carbonate, zinc dioxide, titanium dioxide powder, carbon black or the like is preferably added.

Further, those filler is preferably in the colloidal form since the colloidal filler forms an elastomer having larger tensile strength and larger stretch by removing moisture. The gum for use herein may be carboxymethyl cellulose, methyl cellulose, hydroxyethyl cellulose, polyvinyl alcohol, or polyacrylic acid.

In addition, examples of a moisture curable type silicone elastomer type composition include a deacetone type condensation type composition obtained by using diorganopolysiloxane having silanol groups at the both molecular chain terminals as mentioned above, which preferably has a viscosity of 1000 to 60000 cSt at 25° C., as a main ingredient, adding a cross-linker such as vinylacetoxysilane and a catalyst such as dibutyltin diacetate and dibutyltin dilaurate, further adding fillers for reinforcement such as aerosil, and uniformly kneading it; a deoxime type condensation type silicone elastomer composition obtained according to the same method as the deacetone type condensation type composition, except that the vinyltriacetoxysilane is replaced with vinyltrioximesilane; a dealcoholization type condensation composition obtained by according to the same method as the deacetone type condensation type composition, except that the vinyltriacetoxysilane is replaced with tetraethoxysilane and the like. The invention is not limited to the above-mentioned cross-linking system as long as the cross-linker for use herein may be a cross-linker capable of converting the above diorganopolysiloxane having silanol groups at the both molecular chain terminals to an elastomer.

The radical reaction curable silicone elastomer composition is exemplified by a composition comprising an organopolysiloxane, a reinforcement filler and an organic peroxide. The composition may comprise an additional ingredient such as bulking filler, heat resistance agent, flame retardant, pigment, organic solvent and the like. The organopolysiloxane is exemplified by a gum-like polymer, wherein the both molecular chain terminals are end-blocked with trimethylsiloxy group, dimethylvinyl siloxy group, methylphenylvinyl siloxy group, or silanol group, and the main chain is dimethylpolysiloxane, dimethyl siloxane/methylphenyl siloxane copolymer, dimethyl siloxane/methylvinyl siloxane copolymer, dimethyl siloxane/methylphenyl siloxane/methylvinyl siloxane copolymer, or methyl(3,3,3-trifluoropropyl)/methylvinyl siloxane copolymer.

The reinforcement filler is exemplified by fumed silica. The organic peroxide is exemplified by benzoyl peroxide, dicumyl peroxide, di-t-butyl peroxide, 2,5-dimethyl-2,5-di(t-butyl peroxy)hexane, and 2,5-dimethyl-2,5-di(t-butyl peroxy)hexene. The radical reaction curable silicone elastomer composition is generally cured by heating it from the viewpoints of the curability and productivity.

In addition, examples of the radical reaction curable silicone elastomer composition include a composition which comprises an organopolysiloxane gum as the base compound, which may comprises bulking filler, heat resistance agent, flame retardant, pigment, or organic solvent as an additional ingredient, and which is cured through irradiation of β ray or γ ray; and a composition which comprises an organopolysiloxane containing an alkenyl group bonding to an silicon atom therein, a sensitizer and a reinforcement filler, and which is cured through ultraviolet ray.

The silicone elastomer preferably has an average primary particle diameter of 0.1 to 100 μm, more preferably 2 to 15 μm. The commercial product thereof is exemplified by Torayfil E series manufactured by Dow Corning Toray Corporation, specifically by Torayfil E-500, E-505C, Torayfil E-506S, Torayfil E-507, Torayfil E-508, E-600, E-601, and E-606.

(C-b-4) Polyorganosiloxane Core Graft Copolymer

Polyorganosiloxane core graft copolymer is a composite gum series multilayer structure polymer obtained by polymerizing vinyl monomers consisting of polyfunctional monomers and other monomers capable of copolymerization in the presence of polyorganosiloxane particles to form a cross-linked structure as a core in which the polyorganosiloxane and the vinyl monomer series polymer ingredients are interwined with each other, and further polymerizing vinyl monomers to form shell.

The polyorganosiloxane particles may not only consist of polyorganosiloxane, but also be a modified polyorganosiloxane including other (co)polymer. The polyorganosiloxane particle may comprise polybutyl acrylate, butyl-acrylate styrene copolymer, or the like therein in an amount of 5% by weight or less, but preferably substantively consists of polyorganosiloxane from the viewpoint of the flame resistance.

The polyorganosiloxane particles preferably have a number average molecular weight according to electron microscope observation of 0.008 to 0.6 μm, more preferably 0.01 to 0.2 μm, further more preferably 0.01 to 0.15 μm. The polyorganosiloxane particles having a number average molecular weight of less than 0.008 μm is difficult to obtain. The polyorganosiloxane particles having a number average molecular weight of more than 0.6 μm tends to deteriorate the flame resistance of the resin composition comprising it.

In the polyorganosiloxane particles, the quantity of the polyorganosiloxane particles which do not dissolve in toluene (in the case of 0.5 g of the particles was soaked in 80 ml of toluene at room temperature for 24 hours) is preferably 95% or less, more preferably 50% or less, further more preferably 20% or less from the viewpoints of the flame resistance and impact resistance.

Specific examples of the polyorganosiloxane particles can be obtained by copolymerizing one or more kinds of siloxanes selected from dimethylsiloxane, methylphenylsiloxane, and diphenylsiloxane with a difunctional silane compound and a vinyl series polymerizable group-containing silane compound, or further with a polyfunctional silane compound in addition to the siloxanes, a difunctional silane compound and a vinyl series polymerizable group-containing silane compound.

The polyfunctional monomer which is one kind of the vinyl monomers has a compound having two or more of polymerizable unsaturated bonds in the molecular, and is exemplified by allyl methacrylate, triallyl cyanurate, isocyanuric acid triallyl, diallyl phthalate, ethylene glycol dimethacrylate, 1,3-butylene glycol dimethacrylate, and divinylbenzene. Those may used singly or in combination thereof. Of those, preferred is allyl methacrylate from the viewpoints of the economy and effect thereof.

The monomer capable of copolymerizing therewith as another vinyl monomer is exemplified by aromatic vinyl monomers such as styrene, α-methylstyrene, para-methylstyrene, and para-butylstyrene, vinyl cyanide series monomers such as acrylonitrile and methacrylonitrile, (meth)acrylic acid ester monomers such as methyl acrylate, ethyl acrylate, propyl acrylate, butyl acrylate, acrylic acid-2-ethylhexyl, glycidyl acrylate, hydroxyethyl acrylate, hydroxybutyl acrylate, methyl methacrylate, ethyl methacrylate, butyl methacrylate, lauryl methacrylate, glycidyl methacrylate, and hydroxyethyl methacrylate, carboxyl group-containing vinyl monomers such as itaconic acid, (meth)acrylic acid, fumaric acid, and maleic acid. Those may be used singly or in combination thereof. Preferred is a (meth)acrylic acid ester monomer from the viewpoints of the reactivity and stability.

When the graft copolymer is added into the thermoplastic polyester resin, then the vinyl monomer constructing the shell layer functions as an ingredient which ensures compatibility between the graft copolymer and the resin to uniformly disperse the graft copolymer into the resin. For this, the vinyl monomer constructing the shell layer which is mainly used is preferably the above mentioned (meth)acryl acid ester monomer.

As the polyorganosiloxane core graft copolymer, preferred is a polymer manufactured according to sequent multiple-stage seeded polymerization method which comprises sequentially coating a polymer in a previous stage with a polymer in a later stage. The fundamental polymer structure is a multilayered structure polymer comprising an inner core and an outermost shell layer wherein the inner core comprises a structure in which the polyorganosiloxane gum ingredient having lower glass transition temperature as a cross-linking ingredient and the polyalkyl(meth)acrylate gum ingredient interwine with each other, and the outermost shell layer comprises alkyl(meth)acrylate polymer which improves the adhesiveness to the matrix ingredient of the resin composition. Further, it may be a polymer comprising a three layers-structure which comprises the most inner core of a polymer comprising aromatic vinyl monomers, the interlayer of a polymer in which polyorganosiloxane gum ingredient and polyalkyl(meth)acrylate gum ingredient interwine with each other, and the outermost shell layer of alkyl(meth)acrylate polymer.

In the alkyl(meth)acrylate, the alkyl group has about 1 to 8 carbon atoms, and is exemplified by ethyl, butyl, and 2-ethylhexyl. The alkyl(meth)acrylate polymer may be cross-linked with an cross-linker such as ethylenic unsaturated monomers. The cross-linker is exemplified by alkylenediols, (meth)acrylate, polyester di(meth)acrylate, divinylbenzene, trivinylbenzene, triallyl cyanurate, and allyl(meth)acrylate.

The polyorganosiloxane core graft copolymer is preferably obtained by polymerizing 0.5 to 10 parts by weight, preferably 1 to 5 parts by weight, more preferably 2 to 4 parts by weight, of the vinyl monomer for the core layer and 5 to 50 parts by weight, preferably 10 to 39 parts by weight, more preferably 15 to 38 parts by weight, of the vinyl monomer for the shell layer in the presence of 40 to 90 parts by weight, preferably 60 to 80 parts by weight, more preferably 60 to 75 parts by weight, of the organosiloxane in the total amount of 100 parts by weight.

When the content of the polyorganosiloxane particles is too large or too small, then the resin composition thus-obtained by using this tends to be poor in the flame resistance thereof. When the content of the vinyl monomer for the core is too small, then the resin composition thus-obtained from this tends not to be effective for improving the flame resistance and the toughness. When the content of the vinyl monomers for the shell is too small or too large, then the resin composition thus-obtained by using this tends to be poor in the flame resistance thereof. Such a polyorganosiloxane core graft copolymer may be a commercial product which is exemplified by METABLEN S-2001, S-2200 and SRK-200 which are manufactured by Mitsubishi Rayon Co., Ltd.

(D) Colemanite:

The thermoplastic polyester resin composition of the invention comprises 0.01 to 30 parts by weight of colemanite, relative to 100 parts by weight of the thermoplastic resin. Surprisingly, the inclusion of the colemanite remarkably improves the laser printability. Herefore, the addition of the colemanite into resin compositions has been studied, but such improvement of the laser printability had not been completely unexpected. In particular, it is well-known that the addition of additives to the resin composition tends to break out balance between performances including flowability. However, the composition of the invention is extremely beneficial in that such balance between performances is kept even if the colemanite is added thereto. Further, the inventor has investigated and found the tendency in that the addition of the colemanite thereto suppresses reduction of the flowability. Furthermore, the inventor investigated and confirmed that the laser printability is improved even if the phosphinate (B) is not added to the composition of the invention. When the composition is not required to have the flame resistance, the composition of the invention may be a composition not comprising the phosphinate (B).

The colemanite for use in the invention is an inorganic compound which comprises calcium borate as a main component, and is generally hydrate represented by the chemical formula, $2CaO.3B_2O_3.5H_2O$. The colemanite for use in the invention may be any of HYPERLINK http://stonesagasi-.seesaa.net/article/15439337.html colemanite, calcium series borate mineral which may be called as coleman stone or ulexite, and synthetic compounds. Of those, colemanite which is produced as mineral is preferable because it is excellent in heat stability.

For example, the colemanite for use in the invention as mineral is mineral of water-containing calcium borate, grows on evaporite deposit, and may form short columnar crystal or fake-rhombohedral crystal, which belongs to monoclinic system. Its crystalline form may be particle, dense mass, or round aggregation. The color may be any of various colors such as colorless, white, creamy white, pale yellow. The colemanaite having a color other than those colors may be used in the invention.

When the colemanite for use in the invention is mineral, the colemanite may include impurities originally included in the production. The composition of such colemanite as mineral generally comprises $B_2O_3$ (45.2 to 42.18%), $Fe_2O_3$ (0.35 to 0.03%), $SiO_2$ (3.50 to 4.08%), $Al_2O_3$ (0.51 to 0.16%), CaO (26.01 to 27.06%), SrO (0.62 to 1.19%), MgO (1.06 to 1.43%), $Na_2O_3$ (0.03 to 0.10%), and $K_2O$ (0.16 to 0.03), wherein the content including the impurities is shown as % by weight, and the colemanite may indlude a chemical composition other than the above.

The colemanite for use in the invention may be a commercial product such as Colemanite manufactured by KCM Corporation, and UBP manufactured by Kinsei Matic CO., Ltd. The colemanite for use in the invention may be untreated product of nature or partially-treated product of nature. Specifically, when colemanite is calcined at 400° C. or higher, part of the colemanite becomes $CaO.2B_2O_3$. It is reported that the calcined product exhibits antibacterial effectiveness, antifungal effectiveness, antialgous effectiveness, and the like.

The content of the colemanite is preferably 0.1 to 25 parts by weight, more preferably 1 to 20 parts by weight, furthermore preferably 1 to 15 parts by weight, relative to 100 parts by weight of the thermoplastic polyester resin. By setting such a range, the flame resistance, the flowability, the mechanical strength and the laser printability of the thermoplastic polyester resin composition of the invention are improved. The colemanite preferably has an average particle size of 1 to 50 μm, more preferably 3 to 20 μm, further more preferably 3 to 10 μm. By setting such a range, various performances such as bendability and the flame resistance of the thermoplastic polyester resin of the invention tend to be improved.

The above average particle size of the colemanite is a particle size in which cumulative weight distribution in particle size distribution obtained using SediGraph (X-ray transmission-type particle degree distribution measuring apparatus) is 50%. The SediGraph is an apparatus for measuring particle size degree distribution by irradiating suspension during sedimentation to X ray to measure the amount of X ray-transmission.

When the colemanite for use in the invention is, for example, mineral naturally produced, the colemanite may be prepared to have a desired particle size through grinding according to a conventionally well-known method such as dry grinding method, and wet grinding method. The means for grinding is exemplified by ball mill, roller mill, jet mill, vibro mill, planet mill, and super-mixing mill.

The colemanite for use in the invention may be treated on its surface with a surface treatment agent such as silane coupling agent. The surface treatment agent for use herein may be a conventionally well-known surface treatment agent. Examples of the silane coupling agent include aminosilane, epoxy silane, allylsilane and vinylsilane.

Of those, preferred is the aminosilane coupling agent. Preferred examples of the aminosilane coupling agent include γ-aminopropyltriethoxy silane, γ-aminopropyltrimethoxyilane, and γ-(2-aminoethyl)aminopropyltrimethoxysilane.

As the surface treatment agent of the colemanite, the surface treatment agent such as the above silane coupling agent may include other ingredients, which are exemplified by epoxy resin, urethane resin, acryl resin, antistatic agent, lubricant agent, and water repellent without diverting the effect of the invention.

A surface treatment method using such a surface treatment agent may be a method for preliminarily treating the surface with the surface treatment agent as disclosed in JP-A-2001-172055 or JP-A-S53-106749, or a method for adding the surface treatment agent to the polyester resin composition of the invention, separated from the untreated colemanite when the polyester resin composition is prepared.

(E) Reinforcement Filler:

Reinforcement filler such as glass fiber have been added to thermoplastic resin compositions in order to enhance the toughness of the molded article thereof. However, such a molded article formed from a resin composition comprising reinforcement filler had a problem in that it easily burns since the reinforcement filler acts like candlewick at the time of burning.

Thus, in order to impart the resin composition comprising reinforcement filler with the flame resistance using a calcium salt or an aluminium salt of phosphinate, special effort is necessary to be made. However, the inventor investigated and found that the mechanical strength of the composition can be enhanced, without decreasing the flame resistance, by adding 150 parts by weight or less of the reinforcement filler, relative to 100 parts by weight of the thermoplastic polyester resin.

The reinforcement filler for use in the invention is effective for enhancing the mechanical strength of the composition obtained by adding it to a resin, and may be fabric filler such as glass fiber, carbon fiber, basalt fiber, wollastonite, and potassium titanate fiber. Of those, preferably use is glass fiber from the viewpoints of the mechanical strength, the toughness and the heat resistance. Also may be usable granular or amorphous fillers such as calcium carbonate, titanium oxide, feldspar mineral, clay, organificated clay, carbon black, and glass bead; plate-like fillers such as talc; and squamous fillers such as glass flake, mica, and graphite.

The content of the reinforcement filler (E) is preferably 150 parts by weight or less, more preferably 5 to 120 parts by weight, relative to 100 parts by weight of the thermoplastic polyester resin (A). By setting the amount to 5 parts by weight or more, the effect for reinforcement is sufficiently exerted. By setting the amount to 150 parts by weight or less, the mechanical performance, especially the toughness, can be enhances while the flowability is favorably kept. Heretofore, it has been known that addition of reinforcement decreases the flowability. However, the invention is beneficial since the flowability does not reduce even if the reinforcement filler is added.

In the invention, in addition to the above mentioned ingredients, metal borate may be added. Boric acid to form the metal borate is preferably a non-condensed type boric acid such as orthoboric acid and metaboric acid, a condensed type boric acid such as pyroboric acid, tetraboric acid, pentaboric acid and octaboric acid and a basic boric acid. The metal which forms a salt therewith may be an alkali metal, but is preferably a polyvalent metal such as an alkali earth metal, a transition metal, and a metal in 2B group of the periodic system. The metal borate may be a hydrate.

The metal borate is classified by a non-condensed type borate salt or a condensed type borate salt. Examples of the non-condensed type metal borate include alkali metal borates such as calcium orthoboric acid and calcium metaboric acid; transition metal borates such as manganese orthoboric acid and manganese methaboric acid, metal borates in 2B group of the periodic system such as zinc metaborate and cadmium metaborate. Of those, metaborate is preferable.

Examples of the condensed type borate include alkali metal borates such as tri magnesium tetra borate and calcium pyroborate, transition metals such as manganese tetraborate and nickel diborate, metal borates in 2B group of the periodic system such as zinc tetraborate, and cadmium tetraborate. Examples of the basic borate include metal borates in 2B group of the periodic system such as basic zinc borate and basic cadmium borate. Hydrogen borates corresponding to those borates, for example manganese hydrogen orthoborate, may be also used.

The metal borate for use in the invention is preferably an alkali metal borate and a metal borate in 2B group of the periodic system, specifically zinc borates and calcium borates. The zinc borates include zinc borate ($2ZnO.3B_2O_3$), zinc borate and the like, and the calcium borates include calcium borate anhydride ($2CaO.3B_2O_3$) and brunt calcium borate. Those zinc borates and calcium borates are particularly preferably a hydrate.

By adding the metal borate, the resin composition is further prevented from burning. In the phenomenal fact, the metal borate foams to shut un-burned part from blaze at the time of burning. The content of the metal borate is 0 to 20 parts by weight, and is preferably 1 part by weight or more, relative to 100 parts by weight of the thermoplastic polyester resin. When the amount of the metal borate is excessively add, then the improved effect corresponding to the increase of the content thereof is plateaued. Thus, the content of the metal borate is preferably 1 to 10 parts by weight, more preferably 1 to 5 parts by weight, relative to 100 parts by weight of the thermoplastic polyester resin.

In addition, the resin composition of the invention may comprise various additives which are regularly used for thermoplastic resin composition without diverting the object of the invention. Examples of the additives include antioxidants, ultraviolet absorbers, stabilizers such as light stabilizer, hydrolysis resistance controllers (epoxy compounds, carbodiimide compounds, and the like), antistats, lubricants, mold release agent, and colorants such as dye and pigment, plasticizers. In particular, addition of the antioxidants and the mold release agent are more effective. The content of the additives is generally 10 parts by weight or less, preferably 5 parts by weight or less, relative to 100 parts by weight of the thermoplastic polyester resin.

The dripping at the time of combustion may be further prevented by adding polytetrafluoroethylene obtained through suspension polymerization method or fumed colloidal silica.

In the flame resistance polyester resin composition of the invention, another thermoplastic resin may be used secondarily. The resin available to the invention may be a resin which is stable under high temperature. Specific examples thereof include polycarbonate, polyamide, polyphenylene oxide, polystyrene series resin, polyphenylene sulfide ethylene, polysulphone, poly ether sulphone, polyetherimide, polyether ketone, and fluoro resin.

The resin composition of the invention may be prepared according conventional methods for preparing resin compositions. In general, both of individual ingredients and various additives which may be added in accordance with request are sufficiently mixed, and then, melted and kneaded through a single-screw or double-screw kneader. Individual ingredients are not preliminarily mixed, or only part of the individual ingredients is preliminarily mixed, and then, the material is fed into an extruder with a feeder, and melted and kneaded to prepare the resin composition of the invention. Further, to part of the polyester resin, part of the other ingredients are added, melted, and kneaded to prepare master batch, and then, the remaining polyester resin and the remaining ingredients are added, melted and kneaded.

EXAMPLES

The invention is described in more detail with reference to the following Examples. However, the invention should not be limited to these Examples as far as it exceeds the gist of the invention. Evaluations for the resin composition were carried out according to the following methods.

Flexural Strength:

A burning test specimen having a thickness of 1.6 mm for UL94 (Subject 94, Under-writer's Laboratory) was formed by injection molding, and is subjected to the flexural strength test in the condition that the span distance was 40 mm and testing speed was 2 mm/min.

Flame Resistance Test:

The flame resistance test was carried according to the method of UL94. Five specimens having a thickness of 0.8 mm are subjected to the flame resistance test and are classified into V-0, V-1, V-2, and HB according to the evaluation method disclosed in UL94. V-0 means that the specimen has the greatest level of the flame resistance. Total burning time means sum of the total burning time of the five specimens, which includes sum of burning time in the first flame contact and the second flame contact.

Glow-Wire Ignition Temperature Test (Abbreviated Name: GWIT Test)

A plate test specimen having a thickness of 0.75 mm was subjected to the test according to IEC60695-2-13. Specifically, it is defined as a temperature higher 25° C. than the highest temperature at which a tip of a grow-wire having a prescribed shape (loop nickel/chrome (80/20) wire having major diameter of 4 mm) does not ignite when the grow-wire was contacted for 30 seconds.

The test has the following back ground. In recent years, the electronic stability on electrical and electronic parts is more demanding than before. For example, according to IEC60335-1 standard of International Electrotechnical Commission (abbreviated name: IEC) which was recently revised, materials having a thickness of 0.75 mm are required to satisfy 775° C. of Glow-wire Ignition Temperature (abbreviated name: IEC), wherein the materials are used for electric insulating parts supporting connecting parts and electric insulating parts which are in less than 3 mm away from those connecting parts, wherein the connecting parts are used for a home appliance such as refrigerator and automatic washing machine and can work without an operator (print circuit board, terminal body, plug, or the like), and wherein more than 0.2 A of rated current flows during general behavior through the connecting parts.

Comparative Tracking Index Test (Abbreviated Expression: CTI Test):

Concerning a test specimen (having a thickness of 3 mm), CTI was determined according to the testing method defined in International standard, IEC60112. CTI shows resistance to tracking at 25 V intervals from 100 V to 600 V when solid electric insulating material was polluted while electric field is added to a surface of the solid electric insulating material. When the numerical value is high, the tracking index is good, and is preferably 500 V or more.

The following two tests as a gas evaluation were carried out and the resin compositions were evaluated.

1) Mold Deposit:

Using the injection-molder SE 50 manufactured by Sumitomo Heavy Industries, Ltd., a resin molded article having a length of 35 mm, a wide of 14 mm and a thickness of 2 mm was produced using a pin gate metal in the condition that the injection pressure was 50 MPa, the injection speed was 80 mm/sec, the cylinder temperature was 260° C., the injection period was 3 sec, the cooling was 8 sec, the metal temperature was 80° C., and the suck back was 3 mm.

According to the condition, 1000 shots of the successive injection-molding were carried out, and then, mold deposit which adhered to the mold (metal pollution) was visually observed and evaluated according to the following standard.
◉; mold deposit was hardly observed.
○; mold deposit was slightly observed.
△; mold deposit was clearly observed.
×; mold deposit thickly adhered to the whole of the metal.

2) Total Amount of Produced Gas (GC-MS) (Unit: μg/g resin-ppm):

About 0.02 g of the sample resin was weighted, put into a sample tube, subjected to heat treatment at 270° C. for 10 minutes under helium flow of 30 ml/min, using TD-20, column UA1701, manufactured by Shimadzu Corporation, and trapped as the produced gas with a cryotrap which was cooled to −20° C.

The condition was follows: the temperature of UA1701 was evaluated (kept at 50° C. for 2 minutes, and then evaluated up to 260° C. at the rate of 10° C./10 minutes), and then, evaluated up to 300° C. at the rate of 5° C./10 minutes; gas trapped at the gas inlet temperature of 270° C. was introduced to GC; the total ion chromatogram for the produced gas was measured; the standard curve was formed using n-decane as the internal standard to thereby determine the quantity; and the unit was μg/g resin (=ppm).

Flowability:

Spiral flow length of the resin composition was evaluated using SE50 manufactured by Sumitomo Heavy Industries, Ltd. as an extruder. The condition was that the injection pressure was 170 MPa, the injection speed was 100 mm/sec, the cylinder temperature was 270° C., the injection period was 2 sec, the cooling period was 7 sec, the mold temperature was 80° C., and the suck back was 1 mm. The shape of the evaluated resin molded article was a spiral molded article having a thickness of 1 mm and a wide of 1.5 mm. The size of the spiral molded article is 90 mm×105 mm as its center-to-center distance of the long-resin molded article. The spiral molded article was shown in FIG. 1.

Mold Release Performance:

Using the injection-molder manufactured by Fanuc Corporation (α-100iA), a molded article having a shallow cup-like shape having a thickness of 3 mm, an external diameter of 100 mm, and a deep of 20 mm was successively produced by successive injection-molding in the condition that the resin temperature was 270° C., the mold temperature was 80° C., and the cycle was 25 second. The molded article was visually observed on whether it has a trace of the ejection pin or not, to thereby determine the mold release performance thereof. When the trace of the pin was clearly observed, it was evaluated ×. When the trace of the pin was slightly observed, it was evaluated ○. When the trace of the pin was not observed, it was evaluated ◉.

Laser Printability:

(1) Evaluation Method for Laser Printability Performance:

To the test piece, laser marking was carried out according to Nd-YAG laser in the following condition: the device for use was maker engine, SL475H/HF, manufactured by NEC Corporation; the significant power was 50 W or more; the output current value was 10 A or 15 A; the oscillation wavelength was 1060 nm, the ultrasonic wave Q switch: 2 KHz; and the scanning speed was 200 mm/sec. Marking drawing patterns different to each other each were marked in individual two plates. In one plate thereof, squares having a size of 20×20 mm which were filled were marked, and in the other plate, ten alphabets (ABCDEFGHIJ) having font of 5 mm were marked.

For the laser marking judgment, the two plates which were subjected to the laser marking were visually observed and comprehensively evaluated to classify ranks of ◉, ○, △, and ×, according to the following judgmental standard:
◉: the marking is extremely clear and good;
○: the marking is clear and can be readily recognized;
△: the marking drawing pattern cannot be recognized;
×: no marking or the marking drawing pattern was difficult to be recognized.

The laser marking evaluation (degree of recognition of laser marking parts) was evaluated by quantify the degree of color change from the original material due to laser marking. Specifically, squares having a size of 20×20 mm which were filled were laser-marked, its embossment form height before and after the laser marking were observed with 3D-laser microscope (manufactured by Keyence Corporation: VK-8700), and the embossment form height in printing portion was evaluated. When the value for the embossment form height is larger, the legibility of the laser printing portion due to diffuse reflection of light tends to be clearly excellent.

The materials for use in the Examples are described below.

(A) Thermoplastic Polyester Resin:

(A-1) PBT: manufactured by Mitsubishi Engineering-Plastics Corporation, NOVADURAN (trade mark) 5020, polybutylene terephthalate resin having an inherent viscosity of 1.20 dl/g.

(A-2) PBT: manufactured by Mitsubishi Engineering-Plastics Corporation, NOVADURAN (trade mark) 5008, polybutylene terephthalate resin having an inherent viscosity of 0.85 dl/g.

(A-3) PBT: manufactured by Mitsubishi chemical corporation, NOVAPET (trade mark) PBK1, the inherent viscosity is 0.64 dl/g, which was measured in a mixture solvent of phenol and 1,1,2,2-tetrachloroethane at the weight ratio of 1:1 at 30° C.

(A-4) PTMG/PBT copolymer (polyester ether copolymer): manufactured by Mitsubishi Engineering-Plastics Corporation, NOVADURAN (trade mark) 5510, polybutylene terephthalate resin copolymerized with 20% by weight of polytetramethylene ether glycol unit (the number average molecular weight=about 1016), Tg=22° C., the inherent viscosity=1.3 dl/g, which was measured in a mixture solvent of phenol and 1,1,2,2-tetrachloroethane at the weight ratio of 1:1 at 30° C.

(B) Phosphinate:

Aluminium diethylphosphinate: manufactured by Clariant, OP1240 (product name)

(C) Organosiloxane Compound:

(C-1) Silicone compound 1: manufactured by Dow Corning Toray Corporation, 217Flake (product name), the weight-average molecular weight avelage (Mw):2000, the content of hydroxyl groups: 7% by weight, the content of phenyl group bonding to a silicon atom directly or through an oxygen atom: 100 mol %, the average molecular formula: $(PhSiO_{3/2})_{1.0}(HO_{1/2})_{0.57}$.

(C-2) Silicone compound 2: manufactured by Dow Corning Toray Corporation, TMS217 (product name), Mw: 2000, the content of hydroxyl groups: 2% by weight, the content of phenyl group: 100 mol %, silicone resin obtained by subjecting the silicone compound C to the end-block treatment with trimethylsilyl groups.

(C-3) Silicone compound 3: manufactured by Konishi Chemical Ind. Co., Ltd., SR-21 (product name), Mw: 3800, the content of hydroxyl groups: 6% by weight, the content of phenyl group: 100 mol %, the average molecular formula: $(PhSiO_{3/2})_{1.0}(HO_{1/2})_{0.98}$.

(C-4) Silicone compound 4: manufactured by Konishi Chemical Ind. Co., Ltd., SR-20 (product name), Mw: 6700, the content of hydroxyl groups: 3% by weight, the content of phenyl groups: 100 mol %, the average molecular formula: $(PhSiO_{3/2})_{1.0} (HO_{1/2})_{0.24}$.

(C-5) Silicone compound 5: manufactured by Dow Corning Toray Corporation, SH6018 (product name), Mw: 2000, the content of hydroxyl groups: 6% by weight, the content of phenyl group: 70 mol %, the content of propyl group: 30 mole %, the average molecular formula: $(PhSiO_{3/2})_{0.7} (ProSiO_{3/2})_{0.3} (HO_{1/2})_{0.98}$.

(C-6) Silicone compound 6: manufactured by Shin-Etsu Chemical Co., Ltd., X40-9805 (product name), methylphenyl series organosiloxane, the content of phenyl group: 50 mol %.

(C-7) Silicone compound 7: manufactured by Dow Corning Toray Corporation, 26800 (product name), triphenylsilanol, the content of phenyl group: 100 mol %, the average molecular formula: $Ph_3SiOH$.

(C-8) Silicone compound 8: manufactured by Shin-Etsu Chemical Co., Ltd., octaphenyltetracyclosiloxane, Mw: 793, the content of hydroxy group: 0 mol %, the content of phenyl group: 100 mol %, the average molecular formula: the following formula (7).

All of the above C-1 to C-8 are in the form of solid at 25° C.

[Chemical 11]

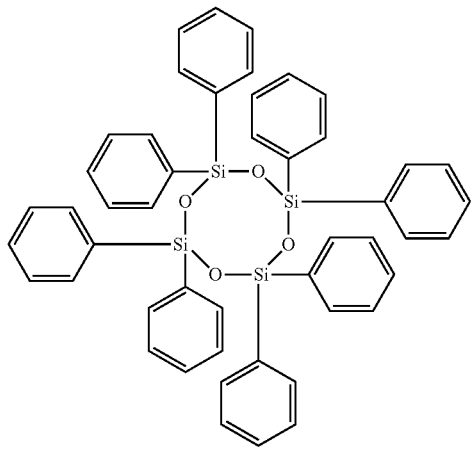

(7)

(C-9) Silicone compound 9: manufactured by Shin-Etsu Chemical Co., Ltd., KR-511 (product name), methylphenyl series organosiloxane oligomer, the content of phenyl group: 50 mol %, it is not in the form of solid at 25° C.

(C-10) Silicone compound 10: manufactured by Momentive Performance Matreials Inc., TSR165 (product name), polymethylphenyl methoxysiloxane, the content of phenyl group: 50 mol %, it is not in the form of solid at 25° C.

(C-11) Silicone compound 11: manufactured by Dow Corning Toray Corporation, DC4 7081; silica-supported silicon powder obtained by supporting 60% by weight of polydimethylsiloxane having with 40% by weight of silica and powdered; the content of hydroxyl groups: 0 mol %, the content of phenyl groups: 0 mole %, it is not in the form of solid at 25° C.

(C-12) Silicone compound 12: manufactured by Dow Corning Toray Corporation, SH200 (product name), polydimethylsiloxane, Mw: $4 \times 10^4$, the content of hydroxyl groups: 0% by weight, the content of phenyl group: 0 mol %, the viscosity: 60000 cPt, it is not in the form of solid at 25° C.

(D-1) Zinc borate: manufactured by BORAX, $2ZnO \cdot 3B_2O_3 \cdot 3.5H_2O$, the average particle size: 9 μm (D-2) Colemanite-1: manufactured by Kinsei Matec Co., Ltd., calcium borate mineral (the main ingredient is $2CaO \cdot 3B_2O_3 \cdot 5H_2O$), the average particle size: 15 μm.

(D-3) Colemanite-2: manufactured by Kinsei Matec Co., Ltd., calcium borate mineral (the main ingredient is $2CaO \cdot 3B_2O_3 \cdot 5H_2O$), the average particle size: 5 μm.

(E-1) Glass fiber: manufactured by Owens Corning Corporation, 03JA-FT592 (product name), the diameter: 10.5 μm.

(F-1) Melamine cyanurate: manufactured bySun Chemical Compamy Ltd., MCA (product name), the average particle size: 5 μm.

(F-2) Melamine polyphosphate: manufactured by Chiba speciality chemical Co., Ltd, melapure 200/70 (product name), the average particle size: 8 μm.

(G) Fluorine series resin: manufactured by Sumitomo 3M, Dyneon TF1750 (product name).

(H-1) manufactured by Chiba speciality chemical Co., Ltd, phenol series antioxidant, Irganox 1010 (product name).

(H-2) Phosphorous stability: manufactured by Adeka Corporation, Adekastab PEP36 (product name).

(H-3) Phosphorous stability: a mixture of mono-stearic acid phosphate and di-stearic acid phosphate at almost equivalent molar ratio (manufactured by ADEKA, ADEKASTABU AX-71).

(H-4) Mold release agent: manufactured by Nippon Seiro Co., Ltd., paraffine wax, FT100 (product name).

(H-5) Lubricant: manufactured by NOF Corporation, Calcium stearate.

(H-6) Pigment: carbon black manufactured by Mitsubishi chemical corporation, MCF #960, the particle size: 16 nm.

According to the weight ratio as shown in the following table, pellets of a polybutylene terephthalate resin composition were obtained by mixing all the ingredients except the glass fiber into the super mixer (manufactured by SHINEI-KIKAI Co., Ltd., type: SK-350), feeding it into the hopper of the double-screw extruder having L/D=42 (manufactured by The Japan Steel Works, Ltd., TEX30XCT), side-feeding the (C) glass fiber, and extruding it at a discharge amount of 20 kg/h, a screw rotation speed of 250 rpm, and a barrel temperature of 260° C. The obtained pellets were formed to test specimens in accordance with the above evaluation method.

TABLE 1

| | | | Example | | | | | |
|---|---|---|---|---|---|---|---|---|
| | | | 1 | 2 | 3 | 4 | 5 | 6 |
| A | A-1 | PBT | 70.00 | 70.00 | 100.00 | 100.00 | 100.00 | 100.00 |
| | A-2 | PBT | | | | | | |
| | A-3 | PET | | | | | | |
| | A-4 | PTMG/PBT copolymer | 30.00 | 30.00 | | | | |
| B | B-1 | Aluminum diethyl phosphinate | 22.62 | 22.48 | 34.98 | 30.35 | 30.35 | 33.96 |
| C | C-1 | Silicone compound 1 | | 0.62 | 1.59 | 3.03 | | |
| | C-2 | Silicone compound 2 | | | | | 3.03 | 3.40 |
| | C-3 | Silicone compound 3 | | | | | | |

TABLE 1-continued

|   |       | Component                                    |      |      |      |      |      |       |
|---|-------|----------------------------------------------|------|------|------|------|------|-------|
|   | C-4   | Silicone compound 4                          |      |      |      |      |      |       |
|   | C-5   | Silicone compound 5                          |      |      |      |      |      |       |
|   | C-6   | Silicone compound 6                          |      |      |      |      |      |       |
|   | C-7   | Silicone compound 7                          |      |      |      |      |      |       |
|   | C-8   | Silicone compound 8                          |      |      |      |      |      |       |
|   | C-9   | Silicone compound 9                          |      |      |      |      |      |       |
|   | C-10  | Silicone compound 10                         |      |      |      |      |      |       |
|   | C-11  | Silicone compound 11                         | 1.26 |      |      |      |      |       |
|   | C-12  | Silicone compound 12                         |      |      |      |      |      |       |
| D | D-1   | Zinc borate                                  |      |      |      |      |      |       |
|   | D-2   | Colemanite 1                                 |      |      |      |      |      |       |
|   | D-3   | Colemanite 2                                 | 0.38 | 0.37 | 4.77 | 1.52 | 1.52 | 13.58 |
| E | E-1   | Glass fiber                                  |      |      | 15.90| 15.17| 15.17| 16.98 |
| F | F-1   | Melamine cyanurate                           |      |      |      |      |      |       |
|   | F-2   | Melamine polyphosphate                       |      |      |      |      |      |       |
| G | G     | Fluorine resin                               | 0.63 | 0.62 | 0.79 | 0.76 | 0.76 | 0.85  |
| H | H-1   | Phenol series antioxidant                    | 0.25 | 0.25 | 0.32 | 0.30 | 0.30 | 0.34  |
|   | H-2   | Phosphorous stability 1                      | 0.25 | 0.25 | 0.32 | 0.30 | 0.30 | 0.34  |
|   | H-3   | Phosphorous stability 2                      |      |      |      |      |      |       |
|   | H-4   | Mold release agent (paraffin wax)            | 0.25 | 0.25 | 0.32 | 0.30 | 0.30 | 0.34  |
|   | H-5   | Lubricant (calcium stearate)                 | 0.04 | 0.04 |      |      |      |       |
|   | H-6   | Pigment (carbon black)                       |      |      |      |      |      |       |
| Properties | | Mechanical performance (Flexural strength (MPa)) | 55 | 53 | 110 | 115 | 121 | 111 |
| | Flame resistance | 0.4 mmt                             | —    | —    | —    | —    | —    | V-0   |
| |                  | Total burning time (s)              | —    | —    | —    | —    | —    | 21.0  |
| |                  | 0.8 mmt                             | V-0  | V-0  | V-0  | V-0  | V-0  | V-0   |
| |                  | Total burning time (s)              | 15   | 10   | 10   | 16   | 15   | 10    |
| | Glow-wire (GWIT, 0.75 mmt) |                           | —    | —    | —    | —    | —    | —     |
| | Electric insulating property (CTI [V]) |              | 600  | 600  | 600  | 575  | 575  | 600   |
| | Gas evaluation | Mold deposite                          | ⊚    | ⊚    | ⊚    | ⊚    | ⊚    | ⊚     |
| |                | GC-MS (Total gas amount (n-decane conversation)[ppm]) | 187 | 128 | 163 | 142 | 144 | 151 |
| | Flowability    | Spiral flow length [mm]                | 193  | 210  | 183  | 179  | 194  | 209   |
| | Mold release performance | Evaluation                    | ⊚    | ⊚    | ⊚    | ⊚    | ⊚    | ⊚     |
| | Laser printability | Evaluation                         | Δ    | Δ    | ⊚    | ○    | ○    | ⊚     |
| |                    | Height of printed part [μm]        | 23   | 25   | 45   | 33   | 34   | 51    |

|   |       |                                  | Example |       |       |       |       |       |
|---|-------|----------------------------------|---------|-------|-------|-------|-------|-------|
|   |       |                                  | 7       | 8     | 9     | 10    | 11    | 12    |
| A | A-1   | PBT                              | 100.00  | 100.00| 100.00| 100.00| 100.00| 100.00|
|   | A-2   | PBT                              |         |       |       |       |       |       |
|   | A-3   | PET                              |         |       |       |       |       |       |
|   | A-4   | PTMG/PBT copolymer               |         |       |       |       |       |       |
| B | B-1   | Aluminum diethyl phosphinate     | 30.35   | 30.35 | 30.35 | 30.35 | 30.35 | 30.35 |
| C | C-1   | Silicone compound 1              |         |       |       |       |       |       |
|   | C-2   | Silicone compound 2              |         |       |       |       |       |       |
|   | C-3   | Silicone compound 3              | 3.03    |       |       |       |       |       |
|   | C-4   | Silicone compound 4              |         | 3.03  |       |       |       |       |
|   | C-5   | Silicone compound 5              |         |       | 3.03  |       |       |       |
|   | C-6   | Silicone compound 6              |         |       |       | 3.03  |       |       |
|   | C-7   | Silicone compound 7              |         |       |       |       | 3.03  |       |
|   | C-8   | Silicone compound 8              |         |       |       |       |       | 3.03  |
|   | C-9   | Silicone compound 9              |         |       |       |       |       |       |
|   | C-10  | Silicone compound 10             |         |       |       |       |       |       |
|   | C-11  | Silicone compound 11             |         |       |       |       |       |       |
|   | C-12  | Silicone compound 12             |         |       |       |       |       |       |
| D | D-1   | Zinc borate                      |         |       |       |       |       |       |
|   | D-2   | Colemanite 1                     |         |       |       |       |       |       |
|   | D-3   | Colemanite 2                     | 1.52    | 1.52  | 1.52  | 1.52  | 1.52  | 1.52  |
| E | E-1   | Glass fiber                      | 15.17   | 15.17 | 15.17 | 15.17 | 15.17 | 15.17 |
| F | F-1   | Melamine cyanurate               |         |       |       |       |       |       |
|   | F-2   | Melamine polyphosphate           |         |       |       |       |       |       |
| G | G     | Fluorine resin                   | 0.76    | 0.76  | 0.76  | 0.76  | 0.76  | 0.76  |
| H | H-1   | Phenol series antioxidant        | 0.30    | 0.30  | 0.30  | 0.30  | 0.30  | 0.30  |
|   | H-2   | Phosphorous stability 1          | 0.30    | 0.30  | 0.30  | 0.30  | 0.30  | 0.30  |
|   | H-3   | Phosphorous stability 2          |         |       |       |       |       |       |

TABLE 1-continued

|  |  |  |  |  |  |  |  |  |
|---|---|---|---|---|---|---|---|---|
|  | H-4 | Mold release agent (paraffin wax) | 0.30 | 0.30 | 0.30 | 0.30 | 0.30 | 0.30 |
|  | H-5 | Lubricant (calcium stearate) |  |  |  |  |  |  |
|  | H-6 | Pigment (carbon black) |  |  |  |  |  |  |
| Properties | Mechanical performance (Flexural strength (MPa)) |  | 120 | 121 | 125 | 123 | 118 | 118 |
| Flame resistance | 0.4 mmt |  | — | — | — | — | — | — |
|  | Total burning time (s) |  | — | — | — | — | — | — |
|  | 0.8 mmt |  | V-0 | V-0 | V-0 | V-0 | V-0 | V-0 |
|  | Total burning time (s) |  | 10 | 11 | 20 | 21 | 9 | 10 |
| Glow-wire (GWIT, 0.75 mmt) |  |  | — | — | — | — | — | — |
| Electric insulating property (CTI [V]) |  |  | 575 | 575 | 600 | 600 | 575 | 575 |
| Gas evaluation | Mold deposite |  | ◎ | ◎ | ◎ | ◎ | ◎ | ◎ |
|  | GC-MS (Total gas amount (n-decane conversation)[ppm]) |  | 161 | 154 | 173 | 179 | 163 | 142 |
| Flowability | Spiral flow length [mm] |  | 181 | 185 | 183 | 178 | 173 | 183 |
| Mold release performance | Evaluation |  | ◎ | ◎ | ◎ | ◎ | ◎ | ◎ |
| Laser printability | Evaluation |  | ○ | ○ | ○ | ○ | ○ | ○ |
|  | Height of printed part [μm] |  | 33 | 34 | 32 | 31 | 30 | 34 |

TABLE 2

|  |  |  | 13 | 14 | 15 | 16 | 17 | 18 |
|---|---|---|---|---|---|---|---|---|
| A | A-1 | PBT | 100.00 | 100.00 |  |  |  |  |
|  | A-2 | PBT |  |  | 100.00 | 100.00 | 100.00 | 100.00 |
|  | A-3 | PET |  |  |  |  |  |  |
|  | A-4 | PTMG/PBT copolymer |  |  |  |  |  |  |
| B | B-1 | Aluminum diethyl phosphinate | 30.35 | 30.35 | 34.25 | 34.25 | 27.17 | 34.76 |
| C | C-1 | Silicone compound 1 |  |  | 5.14 | 5.14 | 0.53 | 4.09 |
|  | C-2 | Silicone compound 2 |  |  |  |  |  |  |
|  | C-3 | Silicone compound 3 |  |  |  |  |  |  |
|  | C-4 | Silicone compound 4 |  |  |  |  |  |  |
|  | C-5 | Silicone compound 5 |  |  |  |  |  |  |
|  | C-6 | Silicone compound 6 |  |  |  |  |  |  |
|  | C-7 | Silicone compound 7 |  |  |  |  |  |  |
|  | C-8 | Silicone compound 8 |  |  |  |  |  |  |
|  | C-9 | Silicone compound 9 | 3.03 |  |  |  |  |  |
|  | C-10 | Silicone compound 10 |  | 3.03 |  |  |  |  |
|  | C-11 | Silicone compound 11 |  |  |  |  |  |  |
|  | C-12 | Silicone compound 12 |  |  |  |  |  |  |
| D | D-1 | Zinc borate |  |  |  | 2.57 |  |  |
|  | D-2 | Colemanite 1 |  |  |  |  |  |  |
|  | D-3 | Colemanite 2 | 1.52 | 1.52 | 4.28 | 1.71 | 6.39 | 2.04 |
| E | E-1 | Glass fiber | 15.17 | 15.17 | 25.68 | 25.68 | 23.97 | 61.35 |
| F | F-1 | Melamine cyanurate |  |  |  |  |  |  |
|  | F-2 | Melamine polyphosphate |  |  |  |  |  |  |
| G | G | Fluorine resin | 0.76 | 0.76 | 0.86 | 0.86 | 0.80 | 1.02 |
| H | H-1 | Phenol series antioxidant | 0.30 | 0.30 | 0.34 | 0.34 | 0.32 | 0.41 |
|  | H-2 | Phosphorous stability 1 | 0.30 | 0.30 | 0.34 | 0.34 | 0.32 | 0.41 |
|  | H-3 | Phosphorous stability 2 |  |  |  |  |  |  |
|  | H-4 | Mold release agent (paraffin wax) | 0.30 | 0.30 | 0.34 | 0.34 | 0.32 | 0.41 |
|  | H-5 | Lubricant (calcium stearate) |  |  |  |  |  |  |
|  | H-6 | Pigment (carbon black) |  |  |  |  |  |  |
| Properties | Mechanical performance (Flexural strength (MPa)) |  | 120 | 121 | 128 | 127 | 125 | 160 |
| Flame resistance | 0.4 mmt |  | — | — | V-0 | — | — | V-0 |
|  | Total burning time (s) |  | — | — | 25 | — | — | 14 |
|  | 0.8 mmt |  | V-0 | V-0 | V-0 | V-0 | V-0 | V-0 |
|  | Total burning time (s) |  | 13 | 21 | 10 | 16 | 30 | 8 |
| Glow-wire (GWIT, 0.75 mmt) |  |  | — | — | — | — | — | — |
| Electric insulating property (CTI [V]) |  |  | 600 | 600 | 600 | 600 | 600 | 600 |

TABLE 2-continued

|  |  |  |  |  |  |  |  |
|---|---|---|---|---|---|---|---|
| Gas evaluation | Mold deposite | ◎ | ◎ | ◎ | ◎ | ◎ | ◎ |
|  | GC-MS (Total gas amount (n-decane conversation)[ppm]) | 132 | 165 | 138 | 130 | 131 | 141 |
| Flowability | Spiral flow length [mm] | 173 | 183 | 233 | 193 | 264 | 205 |
| Mold release performance | Evaluation | ◎ | ◎ | ◎ | ◎ | ◎ | ◎ |
| Laser printability | Evaluation | ○ | ○ | ◎ | ○ | ◎ | ○ |
|  | Height of printed part [μm] | 32 | 35 | 43 | 33 | 45 | 34 |

|  |  |  | 19 | 20 | 21 | 22 | 23 | 24 |
|---|---|---|---|---|---|---|---|---|
| A | A-1 | PBT |  |  |  |  |  |  |
|  | A-2 | PBT | 100.00 | 100.00 | 100.00 | 100.00 | 70.00 | 70.00 |
|  | A-3 | PET |  |  |  |  | 30.00 | 30.00 |
|  | A-4 | PTMG/PBT copolymer |  |  |  |  |  |  |
| B | B-1 | Aluminum diethyl phosphinate | 34.76 | 34.62 | 34.76 | 40.57 | 34.69 | 42.50 |
| C | C-1 | Silicone compound 1 | 4.09 | 4.07 | 4.09 | 16.71 | 4.08 | 5.00 |
|  | C-2 | Silicone compound 2 |  |  |  |  |  |  |
|  | C-3 | Silicone compound 3 |  |  |  |  |  |  |
|  | C-4 | Silicone compound 4 |  |  |  |  |  |  |
|  | C-5 | Silicone compound 5 |  |  |  |  |  |  |
|  | C-6 | Silicone compound 6 |  |  |  |  |  |  |
|  | C-7 | Silicone compound 7 |  |  |  |  |  |  |
|  | C-8 | Silicone compound 8 |  |  |  |  |  |  |
|  | C-9 | Silicone compound 9 |  |  |  |  |  |  |
|  | C-10 | Silicone compound 10 |  |  |  |  |  |  |
|  | C-11 | Silicone compound 11 |  |  |  |  |  |  |
|  | C-12 | Silicone compound 12 |  |  |  |  |  |  |
| D | D-1 | Zinc borate |  |  |  |  |  |  |
|  | D-2 | Colemanite 1 | 2.04 |  |  |  |  |  |
|  | D-3 | Colemanite 2 |  | 2.04 | 2.04 | 7.16 | 2.04 | 25.00 |
| E | E-1 | Glass fiber | 61.35 | 61.10 | 61.35 | 71.60 | 61.22 | 75.00 |
| F | F-1 | Melamine cyanurate |  |  |  |  |  |  |
|  | F-2 | Melamine polyphosphate |  |  |  |  |  |  |
| G | G | Fluorine resin | 1.02 | 1.02 | 1.02 | 1.19 | 1.02 | 1.25 |
| H | H-1 | Phenol series antioxidant | 0.41 | 0.41 | 0.41 | 0.48 | 0.41 | 0.50 |
|  | H-2 | Phosphorous stability 1 | 0.41 |  |  | 0.48 |  |  |
|  | H-3 | Phosphorous stability 2 |  |  |  |  | 0.20 | 0.25 |
|  | H-4 | Mold release agent (paraffin wax) | 0.41 | 0.41 | 0.41 | 0.48 | 0.41 | 0.50 |
|  | H-5 | Lubricant (calcium stearate) |  |  |  |  |  |  |
|  | H-6 | Pigment (carbon black) |  |  | 0.41 |  |  |  |
| Properties | Mechanical performance (Flexural strength (MPa)) |  | 154 | 159 | 159 | 138 | 162 | 160 |
| Flame resistance | 0.4 mmt | | V-0 | V-0 | V-0 | — | V-0 | V-0 |
|  | Total burning time (s) | | 22 | 13 | 9 | — | 8 | 1 |
|  | 0.8 mmt | | V-0 | V-0 | V-0 | V-0 | V-0 | V-0 |
|  | Total burning time (s) | | 10 | 9 | 5 | 29 | 10 | 0 |
| Glow-wire (GWIT, 0.75 mmt) | | | — | — | — | — | 750 | 775 |
| Electric insulating property (CTI [V]) | | | 600 | 600 | 575 | 600 | 550 | 600 |
| Gas evaluation | Mold deposite | | ◎ | ◎ | ◎ | ◎ | ◎ | ◎ |
|  | GC-MS (Total gas amount (n-decane conversation)[ppm]) | | 143 | 55 | 52 | 131 | 73 | 84 |
| Flowability | Spiral flow length [mm] | | 210 | 231 | 230 | 211 | 183 | 201 |
| Mold release performance | Evaluation | | ◎ | ◎ | ◎ | ◎ | ◎ | ◎ |
| Laser printability | Evaluation | | ○ | ○ | ○ | ◎ | ◎ | ◎ |
|  | Height of printed part [μm] | | 35 | 34 | 33 | 43 | 38 | 45 |

TABLE 3

|  |  |  | Comparative Example |  |  |  |  |  |  |  |
|---|---|---|---|---|---|---|---|---|---|---|
|  |  |  | 1 | 2 | 3 | 4 | 5 | 6 | 7 | 8 |
| A | A-1 | PBT | 100.00 |  |  |  |  |  |  | 100.00 |
|  | A-2 | PBT |  | 100.00 | 100.00 | 100.00 | 100.00 | 100.00 | 100.00 |  |
|  | A-3 | PET |  |  |  |  |  |  |  |  |
|  | A-4 | PTMG/PBT copolymer |  |  |  |  |  |  |  |  |
| B | B-1 | Aluminum diethyl phosphinate |  |  |  | 31.30 | 32.57 | 3.98 | 61.12 | 30.35 |
| C | C-1 | Silicone compound 1 |  |  | 3.03 |  |  | 3.98 | 4.89 | 3.03 |
|  | C-2 | Silicone compound 2 |  |  |  |  |  |  |  |  |
|  | C-3 | Silicone compound 3 |  |  |  |  |  |  |  |  |
|  | C-4 | Silicone compound 4 |  |  |  |  |  |  |  |  |
|  | C-5 | Silicone compound 5 |  |  |  |  |  |  |  |  |
|  | C-6 | Silicone compound 6 |  |  |  |  |  |  |  |  |
|  | C-7 | Silicone compound 7 |  |  |  |  |  |  |  |  |
|  | C-8 | Silicone compound 8 |  |  |  |  |  |  |  |  |
|  | C-9 | Silicone compound 9 |  |  |  |  |  |  |  |  |
|  | C-10 | Silicone compound 10 |  |  |  |  |  |  |  |  |
|  | C-11 | Silicone compound 11 |  |  |  |  |  |  |  |  |
|  | C-12 | Silicone compound 12 |  |  |  |  |  |  |  |  |
| D | D-1 | Zinc borate |  |  |  |  |  |  |  | 1.52 |
|  | D-2 | Colemanite 1 |  |  |  |  |  |  |  |  |
|  | D-3 | Colemanite 2 | 5.32 | 1.47 | 1.52 |  | 4.07 | 3.32 | 2.44 |  |
| E | E-1 | Glass fiber |  | 44.18 | 45.52 | 23.47 | 24.43 | 19.89 | 73.35 | 15.17 |
| F | F-1 | Melamine cyanurate |  |  |  |  |  |  |  |  |
|  | F-2 | Melamine polyphosphate |  |  |  |  |  |  |  |  |
| G | G | Fluorine resin | 0.53 | 0.74 | 0.76 | 0.78 | 0.81 | 0.66 | 1.22 | 0.76 |
| H | H-1 | Phenol series antioxidant | 0.21 | 0.29 | 0.30 | 0.31 | 0.33 | 0.27 | 0.49 | 0.30 |
|  | H-2 | Phosphorous stability 1 | 0.21 | 0.29 | 0.30 | 0.31 | 0.33 | 0.27 | 0.49 | 0.30 |
|  | H-3 | Phosphorous stability 2 |  |  |  |  |  |  |  |  |
|  | H-4 | Mold release agent (paraffin wax) | 0.21 | 0.29 | 0.30 | 0.31 | 0.33 | 0.27 | 0.49 | 0.30 |
|  | H-5 | Lubricant (calcium stearate) |  |  |  |  |  |  |  |  |
|  | H-6 | Pigment (carbon black) |  |  |  |  |  |  |  |  |
| Properties | Mechanical performance (Flexural strength (MPa)) |  | 70 | 125 | 123 | 135 | 130 | 149 | 110 | 125 |
|  | Flame resistance | 0.4 mmt | — | — | — | — | — | — | V-0 | — |
|  |  | Total burning time (s) | — | — | — | — | — | — | 8 | — |
|  |  | 0.8 mmt | HB | HB | HB | V-1 | V-1 | V-2 | V-0 | V-0 |
|  |  | Total burning time (s) | — | — | — | 90 | 45 | — | 9 | 19 |
|  | Glow-wire (GWIT, 0.75 mmt) |  | — | — | — | — | — | — | — | — |
|  | Electric insulating property (CTI [V]) |  | 600 | 600 | 575 | 550 | 600 | 600 | 600 | 575 |
|  | Gas evaluation | Mold deposit | ◎ | ◎ | ◎ | ○ | ◎ | ◎ | Δ | ◎ |
|  |  | GC-MS (Total gas amount (n-decane conversation)[ppm]) | 93 | 102 | 111 | 132 | 101 | 82 | 188 | 139 |
|  | Flowability | Spiral flow length [mm] | 253 | 311 | 171 | 253 | 265 | 299 | 131 | 121 |
|  | Mold release performance | Evaluation | ◎ | ◎ | ◎ | X | X | ◎ | ○ | ◎ |
|  | Laser printability | Evaluation | ○ | Δ | Δ | X | ○ | ◎ | ○ | X |
|  |  | Height of printed part [μm] | 35 | 24 | 23 | 5 | 38 | 44 | 35 | 10 |

|  |  |  | Comparative Example |  |  |  |  |  |  |
|---|---|---|---|---|---|---|---|---|---|
|  |  |  | 9 | 10 | 11 | 12 | 13 | 14 | 15 |
| A | A-1 | PBT |  |  |  |  | 100.00 |  |  |
|  | A-2 | PBT | 100.00 | 100.00 | 100.00 | 100.00 |  | 100.00 | 100.00 |
|  | A-3 | PET |  |  |  |  |  |  |  |
|  | A-4 | PTMG/PBT copolymer |  |  |  |  |  |  |  |
| B | B-1 | Aluminum diethyl phosphinate | 34.25 | 31.53 | 31.51 | 43.76 | 30.35 | 25.54 | 37.86 |
| C | C-1 | Silicone compound 1 | 5.14 |  |  | 4.09 |  | 0.50 | 15.59 |
|  | C-2 | Silicone compound 2 |  |  |  |  |  |  |  |
|  | C-3 | Silicone compound 3 |  |  |  |  |  |  |  |
|  | C-4 | Silicone compound 4 |  |  |  |  |  |  |  |
|  | C-5 | Silicone compound 5 |  |  |  |  |  |  |  |
|  | C-6 | Silicone compound 6 |  |  |  |  |  |  |  |
|  | C-7 | Silicone compound 7 |  |  |  |  |  |  |  |
|  | C-8 | Silicone compound 8 |  |  |  |  |  |  |  |
|  | C-9 | Silicone compound 9 |  |  |  |  |  |  |  |
|  | C-10 | Silicone compound 10 |  |  |  |  |  |  |  |
|  | C-11 | Silicone compound 11 |  |  |  |  |  |  |  |
|  | C-12 | Silicone compound 12 |  |  |  |  | 3.03 |  |  |

TABLE 3-continued

| | | | | | | | | | |
|---|---|---|---|---|---|---|---|---|---|
| D | D-1 | Zinc borate | 4.28 | | | | 2.04 | | |
| | D-2 | Colemanite 1 | | | | | | | |
| | D-3 | Colemanite 2 | | 2.25 | 3.15 | | 1.52 | | |
| E | E-1 | Glass fiber | 25.68 | 67.57 | 63.03 | 61.35 | 15.17 | 22.53 | 66.82 |
| F | F-1 | Melamine cyanurate | | | 22.52 | | | | |
| | F-2 | Melamine polyphosphate | | | | 11.13 | | | |
| G | G | Fluorine resin | 0.86 | | | 1.02 | 0.76 | 0.75 | 1.11 |
| H | H-1 | Phenol series antioxidant | 0.34 | 0.45 | 0.42 | 0.41 | 0.30 | 0.30 | 0.45 |
| | H-2 | Phosphorous stability 1 | 0.34 | 0.45 | 0.42 | 0.41 | 0.30 | 0.30 | 0.45 |
| | H-3 | Phosphorous stability 2 | | | | | | | |
| | H-4 | Mold release agent (paraffin wax) | 0.34 | 0.45 | 0.42 | 0.41 | 0.30 | 0.30 | 0.45 |
| | H-5 | Lubricant (calcium stearate) | | | | | | | |
| | H-6 | Pigment (carbon black) | | | | | | | |
| Properties | Mechanical performance (Flexural strength (MPa)) | | 130 | 150 | 162 | 161 | 121 | 137 | 148 |
| | Flame resistance | 0.4 mmt | V-1 | V-0 | V-0 | V-1 | — | — | — |
| | | Total burning time (s) | 40 | 22 | 23 | 42 | — | — | — |
| | | 0.8 mmt | V-0 | V-0 | V-0 | V-0 | V-1 | V-1 | V-1 |
| | | Total burning time (s) | 25 | 30 | 29 | 24 | 48 | 60 | 78 |
| | Glow-wire (GWIT, 0.75 mmt) | | — | — | — | — | — | — | — |
| | Electric insulating property (CTI [V]) | | 600 | 600 | 600 | 600 | 600 | 550 | 450 |
| | Gas evaluation | Mold deposit | ◎ | X | X | ◎ | ○ | ◎ | ○ |
| | | GC-MS (Total gas amount (n-decane conversation)[ppm]) | 123 | 705 | 695 | 133 | 201 | 142 | 152 |
| | Flowability | Spiral flow length [mm] | 183 | 243 | 272 | 161 | 183 | 201 | 169 |
| | Mold release performance | Evaluation | ◎ | ○ | ○ | ◎ | ○ | ○ | ◎ |
| | Laser printability | Evaluation | X | Δ | Δ | X | Δ | X | X |
| | | Height of printed part [μm] | 11 | 22 | 24 | 8 | 20 | 5 | 5 |

As is clear from the above tables, when the organosiloxane polymer (C-12) which is out of the invention is used, the flame resistance is not sufficient. In addition, compared with Examples 4, 5, 7 and the like with Comparative Example 13, it was found that use of the organosiloxane polymer defined in the invention tends to achieve superior laser printing performance to use of organosiloxane polymer other than the organosiloxane polymer defined in the invention.

It is generally known that filler in composition comprising filler in a relatively-larger amount becomes a crystal core for PBT which is a crystalline resin to promote crystallization of PBT, and, as a result, the flowability of the composition reduces. However, it was found in the composition of the invention that the reduction of the flowability tends to be suppressed even if the composition comprises colemanite which is one kind of filler. By using a resin having aromatic rings in the high concentration such as Examples 23 and 24, it was found that GWIT was improved. While it is well-known that use of such a resin decreases CTI, the CTI in the invention did not reduce. As is clear from Comparative Examples 10 and 11, it was found that mold deposit occurs when the nitrogen-containing compound such as melamine cyanurate and melamine polyphosphate was used.

INDUSTRIAL APPLICABILITY

The thermoplastic polyester resin composition of the invention may have the following characteristics.
(1) The composition has excellent flame resistance and mechanical characteristics even if the composition is molded to a molded article having a thickness of 1 mm or less.
(2) Since the composition sufficiently ensures the flame resistance even if the content of a halogen series flame retardant therein is not more than 1% by weight, or the composition does not include a halogen series flame retardant, the composition does not produce dioxine and does not pollute environment very much during the time of burning.

(3) Since the composition is excellent in the flame resistance, it does not change its shape very much when it is molded.

(4) Since the composition may become excellent in flowability, the composition can be subjected to flakiness molding, or to multi-cavity molding. Therefore, the composition is excellent in productivity.

(5) Since the composition has remarkably less mold deposit, it has good productivity in molding.

(6) An injection-molded article of the composition can be printed by laser. Brand or the like can be written thereto, and therefore, it is useful.

(7) The resin composition is excellent in the tracking resistance, and is available to various uses in electric and electronic field.

(8) The composition is excellent in Glow-wire characteristics. The composition is applicable to electric insulating parts supporting connecting parts and electric insulating parts which are in less than 3 mm away from those connecting parts in accordance with IEC60335-1 standard of International Electrotechnical Commission (abbreviated name: IEC), wherein the connecting parts are a home appliance such as refrigerator and automatic washing machine, work without an operator, and wherein more than 0.2 A of rated current flows during general behavior through the connecting parts.

(9) Even if the content of the organic nitrogen compound such as melamine cyanurate and melamine polyphosphate is decreased therein, for example the content is 2% by weight or less, relative to the content of the composition, the flame resistance is sufficiently ensured.

The invention claimed is:

1. A thermoplastic resin composition comprising 100 parts by weight of a thermoplastic polyester resin (A), 5 to 60 parts by weight of a phosphinate (B) represented by the following formula (1) or (2), 0.1 to 20 parts by weight of an organosiloxane (C), and 0.01 to 30 parts by weight of a colemanite (D), wherein the organosiloxane (C) is an organosiloxane compound (C-a) comprising organic groups bonding to a silicon atom directly or through an oxygen atom, wherein 40 mole % or more of the organic groups are an aryl group, and/or an organosiloxane polymer (C-b) in the form of solid at 25° C.;

[Chemical 1]

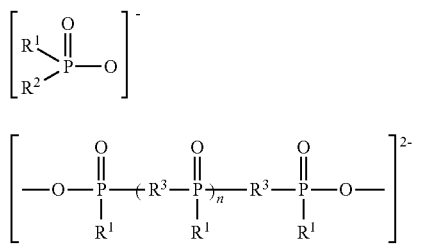

wherein R1's and R2 each independently are an alkyl group having 1 to 6 carbon atoms, or an aryl group which may have a substituent; R1's may be the same or different to each other; R3's are an alkylene group having 1 to 10 carbon atoms, an arylene group which may have a substituent, or a combination of at least two thereof; R3's may be the same or different to each other; and n is an integer of 0 to 4.

2. The thermoplastic polyester resin composition according to claim 1, wherein the organosiloxane (C) is the organosiloxane compound (C-a) comprising organic groups bonding to a silicon atom directly or through an oxygen atom, wherein 40 mole % or more of the organic groups are an aryl group.

3. The thermoplastic polyester resin composition according to claim 1, wherein the content of the organosiloxane (C) is 0.1 to 17 parts by weight, relative to 100 parts by weight of the thermoplastic polyester resin.

4. The thermoplastic polyester resin composition according to claim 1, wherein the content of the colemanite (D) is 0.1 to 15 parts by weight, relative to 100 parts by weight of the thermoplastic polyester resin (A).

5. The thermoplastic polyester resin composition according to claim 1, wherein the content of the colemanite (D) is 1.5 to 15 parts by weight, relative to 100 parts by weight of the thermoplastic polyester resin (A).

6. The thermoplastic polyester resin composition according to claim 1, further comprising 150 parts by weight or less of a reinforcement filler (E), relative to 100 parts by weight of the thermoplastic polyester resin (A).

7. The thermoplastic polyester resin composition according to claim 2, wherein the organosiloxane (C-a) has a weight-average molecular weight of 200 to 10000.

8. The thermoplastic polyester resin composition according to claim 2, wherein the organosiloxane compound (C-a) comprises a structural unit represented by RSiO1.5, wherein R represents an organic group, and comprises hydroxy groups in an amount of 1 to 10% by weight.

9. The thermoplastic polyester resin composition according to claim 1, wherein the thermoplastic polyester resin is polyethylene terephthlate or polybutylene terephthalate.

10. The thermoplastic polyester resin composition according to claim 1, wherein the thermoplastic polyester resin (A) is polybutylene terephthalate.

11. The thermoplastic polyester resin composition according to claim 2, wherein 50 mole % or more of the organic groups are an aryl group.

12. The thermoplastic polyester resin composition according to claim 2, wherein 40 mole % or more of the organic groups are a phenyl group which may have a hydroxy group as a substituent.

13. The thermoplastic polyester resin composition according to claim 12, wherein the content of hydroxy group in the organosiloxane (C-a) is 1 to 10% by weight.

14. The thermoplastic polyester resin composition according to claim 2, wherein the organosiloxane (C-a) comprises at least one selected from the following M, D, T and Q;

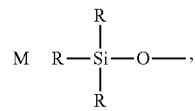

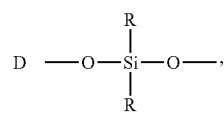

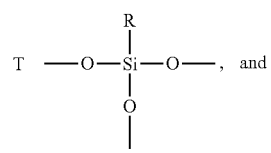

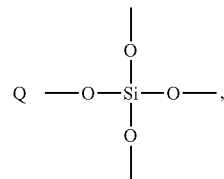

wherein R's each independently represent a monovalent hydrocarbon group having 1 to 12 carbon atoms.

15. The thermoplastic polyester resin composition according to claim 2, wherein the organosiloxane (C-a) comprises the following T;

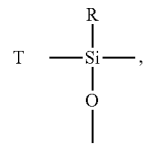

wherein R represents a monovalent hydrocarbon group having 1 to 12 carbon atoms.

16. The thermoplastic polyester resin composition according to claim 2, wherein the organosiloxane (C-a) comprises the following T in an amount of 80 mole % or more;

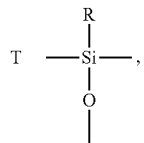

wherein R represents a monovalent hydrocarbon group having 1 to 12 carbon atoms.

17. The thermoplastic polyester resin composition according to claim 1, wherein the colemanite (D) has an average particle size of 1 to 50 μm.

18. The thermoplastic polyester resin composition according to claim 1, further comprising metal borate.

19. The thermoplastic polyester resin composition according to claim 1, which is halogen-free.

20. A molded article formed from the thermoplastic polyester resin composition according to claim 1 through injection-molding.

* * * * *